US012643629B2

(12) United States Patent (10) Patent No.: US 12,643,629 B2
Redecker et al. (45) Date of Patent: Jun. 2, 2026

(54) DERAILLEUR FOR A BICYCLE

(71) Applicant: SRAM DEUTSCHLAND GmbH, Schweinfurt (DE)

(72) Inventors: Heiko Redecker, Dittelbrunn (DE); Tobias Harcke, Dittelbrunn (DE)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 0 days.

(21) Appl. No.: 18/772,932

(22) Filed: Jul. 15, 2024

(65) Prior Publication Data

US 2025/0033740 A1      Jan. 30, 2025

(30) Foreign Application Priority Data

Jul. 25, 2023    (DE) ..................... 10 2023 119 709.6

(51) Int. Cl.
  *B62M 9/1244*      (2010.01)
  *B62M 9/122*      (2010.01)
  *B62M 9/1242*      (2010.01)
  *B62M 9/1248*      (2010.01)
  *B62M 9/126*      (2010.01)
(52) U.S. Cl.
  CPC ........ *B62M 9/1244* (2013.01); *B62M 9/1242* (2013.01); *B62M 9/1248* (2013.01); *B62M 9/126* (2013.01); *B62M 9/122* (2013.01)
(58) Field of Classification Search
  CPC ...... B62M 9/126; B62M 9/125; B62M 9/122; B62M 9/1244; B62M 9/1242; B62M 9/1248

USPC ..................................................... 474/80, 82
See application file for complete search history.

(56) References Cited

U.S. PATENT DOCUMENTS 7,722,488 B2 *  5/2010  Kunisawa .............. B62M 9/121
                                                    474/82
8,852,041 B2 *  10/2014  Yamaguchi ........... B62M 9/126
                                                    474/80
8,870,692 B2 *  10/2014  Yamaguchi ........... B62M 9/126
                                                    474/80
8,870,693 B2 *  10/2014  Shahana ................ B62M 9/121
                                                    474/82

(Continued)

FOREIGN PATENT DOCUMENTS

DE          2521043        9/1977
DE          2719241        12/1979

(Continued)

*Primary Examiner* — Henry Y Liu

(57)      ABSTRACT

The invention relates to a rear derailleur for a bicycle gearing system comprising: a base element which can be fitted to a bicycle frame; and a movable element which is coupled to the base element by a pivot mechanism and which can be displaced relative thereto in a pivotably movable manner, wherein the pivot mechanism is pivotably movable both relative to the movable element and relative to the base element. The rear derailleur comprises for easier adjustment of the chain tension a blocking device which is configured to at least temporarily secure the movable element relative to the base element, wherein the blocking device is configured in such a manner that the pivot mechanism can be temporarily secured by a direct coupling relative to the base element or relative to the movable element in at least one predetermined blocking position.

20 Claims, 13 Drawing Sheets

(56) References Cited

U.S. PATENT DOCUMENTS

| | | | | |
|---|---|---|---|---|
| 9,039,551 B2* | 5/2015 | Bohm | ............... | B62M 9/1244 |
| | | | | 474/82 |
| 9,463,846 B1* | 10/2016 | Chang | ............... | B62M 9/1248 |
| 9,751,590 B2* | 9/2017 | Shipman | ............. | B62M 9/1248 |
| 10,759,494 B2* | 9/2020 | Shipman | ............. | B62M 9/1248 |
| 11,001,339 B2* | 5/2021 | Liao | ............... | B62M 9/124 |
| 11,780,532 B2* | 10/2023 | Braedt | ............... | B62M 9/124 |
| | | | | 474/80 |
| 11,866,127 B2* | 1/2024 | Boehm | ............... | B62M 9/125 |
| 2008/0081716 A1* | 4/2008 | Watarai | ............... | B62M 9/125 |
| | | | | 474/80 |
| 2008/0125259 A1* | 5/2008 | Kunisawa | ............. | B62M 9/126 |
| | | | | 474/82 |
| 2012/0083371 A1* | 4/2012 | Yamaguchi | ........... | B62M 9/126 |
| | | | | 474/80 |
| 2012/0083372 A1* | 4/2012 | Yamaguchi | ........... | B62M 9/126 |
| | | | | 474/80 |
| 2013/0130853 A1* | 5/2013 | Bohm | ............... | B62M 9/124 |
| | | | | 474/80 |
| 2013/0288834 A1* | 10/2013 | Yamaguchi | ........... | B62M 9/126 |
| | | | | 474/80 |
| 2013/0303317 A1* | 11/2013 | Yamaguchi | ........... | B62M 9/126 |
| | | | | 474/80 |
| 2013/0310204 A1* | 11/2013 | Shahana | ............... | B62M 9/121 |
| | | | | 474/80 |
| 2016/0046352 A1* | 2/2016 | Shipman | ............... | B62M 9/128 |
| | | | | 29/428 |
| 2016/0176478 A1* | 6/2016 | Chang | ............... | B62M 9/126 |
| | | | | 474/69 |
| 2016/0304160 A9* | 10/2016 | Chang | ............... | B62M 9/121 |
| 2017/0327183 A1* | 11/2017 | Shipman | ............. | B62M 9/1248 |
| 2019/0144071 A1* | 5/2019 | Boehm | ............... | B62M 9/1242 |
| | | | | 474/80 |
| 2020/0062343 A1* | 2/2020 | Braedt | ............... | B62M 9/124 |
| 2020/0062344 A1* | 2/2020 | Liao | ............... | B62M 9/1242 |
| 2021/0054929 A1* | 2/2021 | Braedt | ............... | B62K 25/30 |
| 2022/0063763 A1* | 3/2022 | Braedt | ............... | B62M 9/125 |
| 2022/0411017 A1* | 12/2022 | Braedt | ............... | B62M 9/122 |
| 2023/0406448 A1* | 12/2023 | Braedt | ............... | B62M 9/126 |

FOREIGN PATENT DOCUMENTS

| | | |
|---|---|---|
| DE | 19815462 | 10/1999 |
| DE | 102011118912 | 5/2013 |
| DE | 102018001253 | 9/2018 |
| DE | 102018208053 | 1/2019 |
| DE | 102020209370 | 2/2021 |
| DE | 102021003745 | 3/2022 |
| DE | 102022115599 | 12/2022 |
| EP | 0013647 | 9/1982 |
| EP | 0875444 | 12/2003 |
| EP | 1342658 | 11/2011 |
| EP | 1764297 | 11/2012 |

* cited by examiner

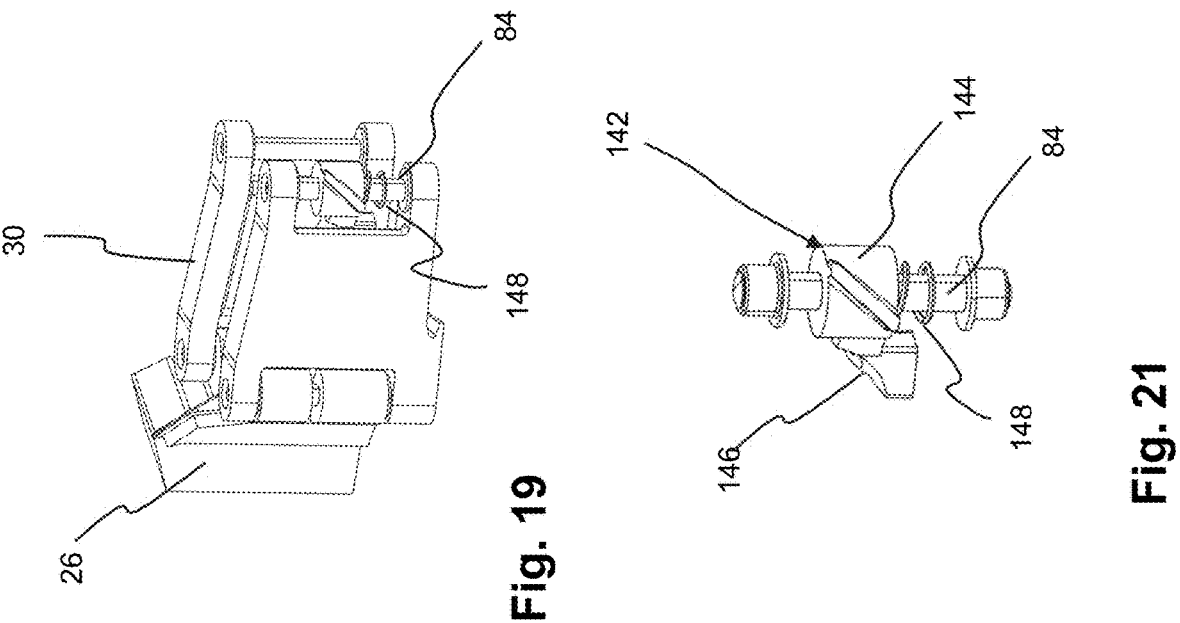
Fig. 19
Fig. 21
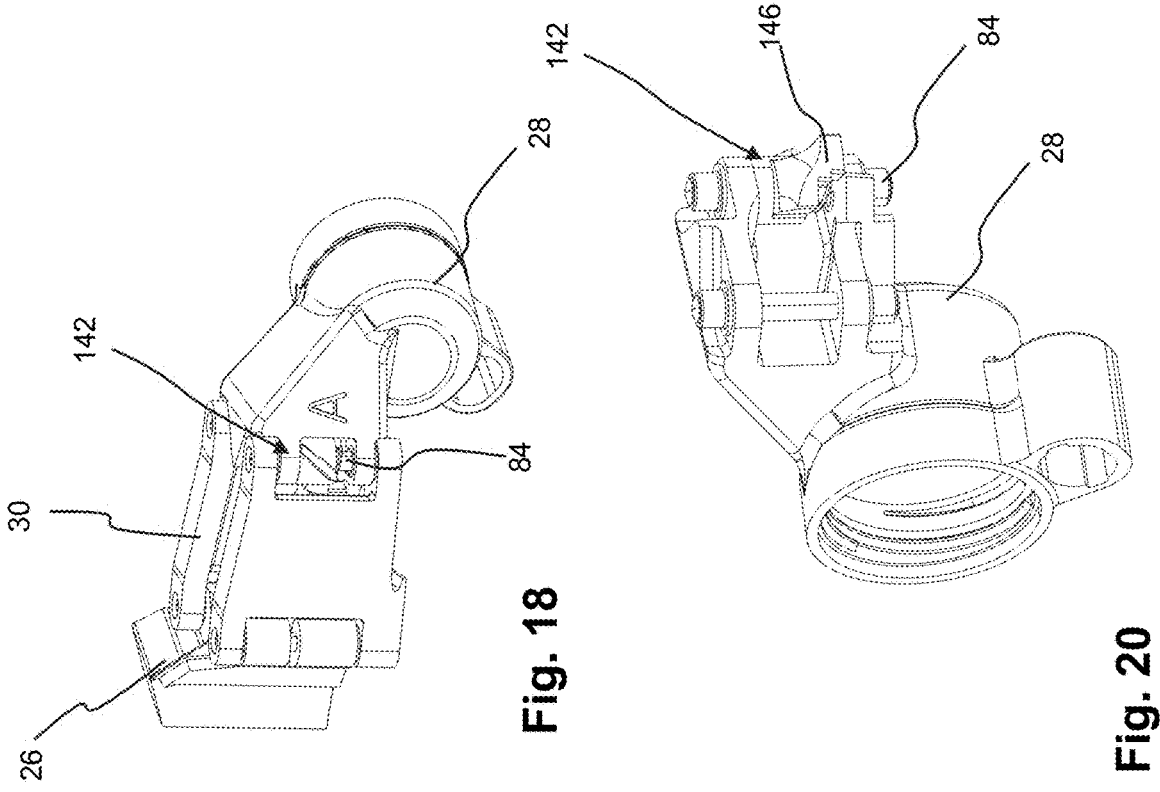
Fig. 18
Fig. 20

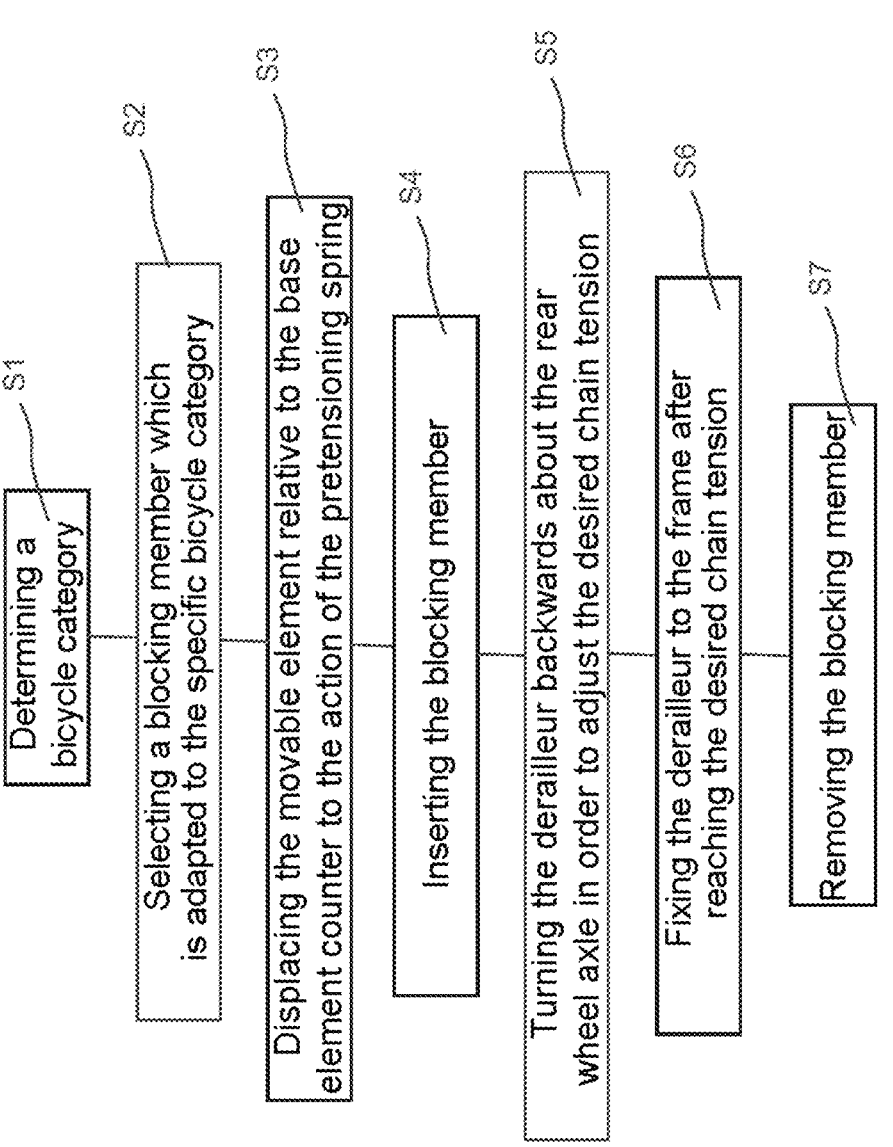

Fig. 25

S1
Determining a bicycle category

S2
Selecting a blocking member which is adapted to the specific bicycle category S3
Displacing the movable element relative to the base element counter to the action of the pretensioning spring S4
Inserting the blocking member S5
Turning the derailleur backwards about the rear wheel axle in order to adjust the desired chain tension S6
Fixing the derailleur to the frame after reaching the desired chain tension S7
Removing the blocking member

DERAILLEUR FOR A BICYCLE

This application claims the benefit of German Patent Application No. 10 2023 119 709.6, filed Jul. 25, 2023, which is hereby incorporated by reference in its entirety.

BACKGROUND

Conventional rear derailleurs have been fixed for some time to the right dropout of the frame using a derailleur hanger. The derailleur hanger is to this end secured at one end coaxially with the rear wheel axle to the frame and at another end coaxially with the B-axle of the base element (B knuckle) of the derailleur. The spacing between the geometric axis A of the rear wheel axle and the B axle of the base element is bridged by the derailleur hanger. The base element in the state secured to the frame can be rotated relative to the derailleur hanger about the B axle. The rotation of the derailleur is limited in a forward direction—in a counterclockwise direction (GUZS)—by means of the B screws. The rotation of the derailleur to the rear (in a clockwise direction (UZS)) is counteracted by the chain tension.

With regard to the technical background of rear derailleurs, the following should be taken into account. Sprocket sets have a gear spread of 500 percent or more. Such gear spreads can be achieved with a smallest sprocket having 9, 10 or 11 teeth and a largest sprocket having 50, 51, 52 teeth or more. In order to be able to operate the increased number of sprockets with the derailleur, the derailleur dimension is increased.

In the prior art, rear derailleurs with oblique pivot mechanisms (oblique parallelogram) were often used. In the event of sudden loads in a vertical direction, as occur when driving over rough terrain, such derailleurs can lead to an abrupt movement of the pivot mechanism and consequently to undesirable switching operations (so-called "ghost shifting"). In order to be able to approach the sprockets of modern sprocket cassettes of greatly different sizes, the oblique parallelogram would have to be positioned in an even more oblique manner and/or the derailleur dimensions would have to be further increased. Both would further increase the susceptibility to undesirable switching operations.

The spacing between the upper chain roll of a derailleur and the sprocket, under which the chain roll is positioned, is referred to as a B gap or chain gap. In the development of a derailleur, a B gap path which is as far as possible constant is generally desired. This constant B gap path or a resultant B gap path curve results from the cooperation of different geometric parameters, such as, for example, parallelogram geometry (pivot mechanism), spacing of the parallelogram with respect to the rear wheel axle A, angle of the parallelogram with respect to the connection plane, axle-bottom bracket axle (B angle), spacing of the P knuckle axle (P axle) with respect to the parallelogram, cage geometry, size of the chain rollers, translation spectrum of the sprocket cassette, etc.

It has been found that precise initial adjustment of the B gap has a particularly significant influence on the robustness and the switching performance. With the common methods, an ideal B gap adjustment is often possible only with difficulty and requires a complex and expert assembly. A problem in this instance is particularly the lack of reference for a precise adjustment and the excessively complex adjustment process for less experienced users without assembly experience. The use of B-gap templates is helpful in this instance but, as a result of application errors, often leads to non-optimal results.

This problem could in the recent past in a particularly advantageous manner be counteracted by means of a configuration of the rear derailleur in which it is assembled coaxially with the rear wheel axle on the bicycle frame. A coaxial derailleur connection with an adjustable stop element enables a defined locking between the chain guiding arrangement (cage) and movable element (P knuckle) and enables a simple, rapid and very precise adjustment of the B gap.

Even if significant advantages with regard to the simplicity and the reliability of the assembly and adjustment of the derailleur could thereby be achieved, however, in practice another problem has been encountered. There is a difference in the adjustment and in the operation between bicycles of different categories, that is to say, bicycles with frames in which the rear wheel is unsprung (so-called hardtails) and bicycles having frames with a rear wheel suspension (so-called fullies). In bicycles having frames which provide a rear wheel suspension, wherein the rear wheel is supported on a rear structure which is suspended in a spring-mounted manner, the rear structure geometry changes during deflection with corresponding effects on the B gap, inter alia as a result of length change of the chain struts and change of the B angle. For this reason, the B gap must previously be adjusted in the so-called sag position of the spring-mounting. In this sag position, the rear structure is completely spring-mounted. To this end, the rear structure during assembly and adjustment of the chain tension must be accordingly loaded in order to achieve such a significant deflection. To this end, it is necessary for two people or other means to be required for the adjustment. To this end, for example, in the suspension, damper air must be released in the suspension, the damper must be removed or compressed by auxiliary means, such as, for example, a tension belt.

Mechanical derailleurs of a newer construction type, in which the derailleur hanger is superfluous, that is to say, derailleurs in particular for coaxial assembly on the rear wheel axle of a bicycle frame, are known from documents EP 0 875 444 A1, EP 1 342 658 A1 and EP 1 764 297 A1. The separate derailleur hanger is omitted, the B axis of the base element extends along the rear wheel axle A, that is to say, coaxially with the rear wheel axle A. Document DE 10 2018 001 253 A1 describes a rear derailleur having a specific configuration for coaxially fitting to the rear derailleur hanger. In this context, reference may further be made to document DE 10 2022 115 599 A1 as technical background.

DE 10 2018 208 053 A1 discloses a rear derailleur having an integrated display or marking on the chain guide. The marking on the derailleur has the same function as a B gap template with the advantage that no additional components are required. The marking shows the correct spacing of the upper chain roll relative to the outer circumference of the largest sprocket of a multi-sprocket arrangement (B-Gap). However, the disadvantage of this embodiment is that the marking indicates only a single adjustment position of the derailleur relative to the multiple sprocket arrangement. That is to say, regardless of the bicycle category (hardtail or fully), the derailleur is always adjusted in the same adjustment position. The possibility of varying the adjustment position depending on the bicycle category does not exist. Accordingly, fully spring-mounted bicycles can until now only be adjusted in the sag position—that is to say, in the completely deflected state.

Document DE 10 2021 003 745 A1 describes a derailleur of the type described above with an electromechanical drive. In this instance, there is provision for a chain guide arrangement to be able to be temporarily secured relative to the base element by a blocking device. Furthermore, the electromechanically driven derailleur can be moved via the drive and the gear mechanism which is associated therewith into a predetermined switching position for assembly and temporarily retained therein. It is thereby possible for the derailleur to be mounted and adjusted in a predetermined position on the frame. In specific embodiments, this blocking device can be moved into different blocking positions. The specific nature of this solution involves the blocking device always engaging between the base element and the chain guiding arrangement and in this instance in particular on a chain guiding sheet of the cage of the chain guiding arrangement.

The blocking device is thereby relatively exposed which can be disadvantageous during operation. A blocking of the derailleur is carried out via the electromechanical drive.

A comparable blocking device is further described in document DE 10 2011 118 912 A1 in various embodiments. Also in this instance, there is provision for the chain guiding arrangement to be secured relative to the movable element in predetermined blocking positions.

Document DE 10 2020 209 370 A1 describes a rear derailleur having an integrated damper sub-assembly. The damper sub-assembly acts between the movable element of the derailleur and the chain guiding arrangement in order to damp movements or vibrations of the chain guiding arrangement relative to the movable element.

SUMMARY

According to one aspect, a rear derailleur for a bicycle gearing system includes: a base element which can be fitted to a bicycle frame; and a movable element which is coupled to the base element by a pivot mechanism and which can be displaced relative thereto in a pivotably movable manner. The pivot mechanism is pivotably movable both relative to the movable element and relative to the base element, such that a blocking device which is configured to at least temporarily secure the movable element relative to the base element, where the blocking device is configured in such a manner that the pivot mechanism can be temporarily secured by a direct coupling relative to the base element or relative to the movable element in at least one predetermined blocking position.

BRIEF DESCRIPTION OF DRAWINGS

FIG. 18 shows an illustration relating to a fourth variant according to the invention of the blocking device;

FIG. 19 shows an illustration relating to a fourth variant according to the invention of the blocking device;

FIG. 20 shows an illustration relating to a fourth variant according to the invention of the blocking device;

FIG. 21 shows an illustration relating to a fourth variant according to the invention of the blocking device;

FIG. 25 shows a flow chart in order to explain the method according to the invention.

Other aspects and advantages of the embodiments disclosed herein will become apparent upon consideration of the following detailed description, wherein similar or identical structures have similar reference numerals.

DETAILED DESCRIPTION

Figure 1:
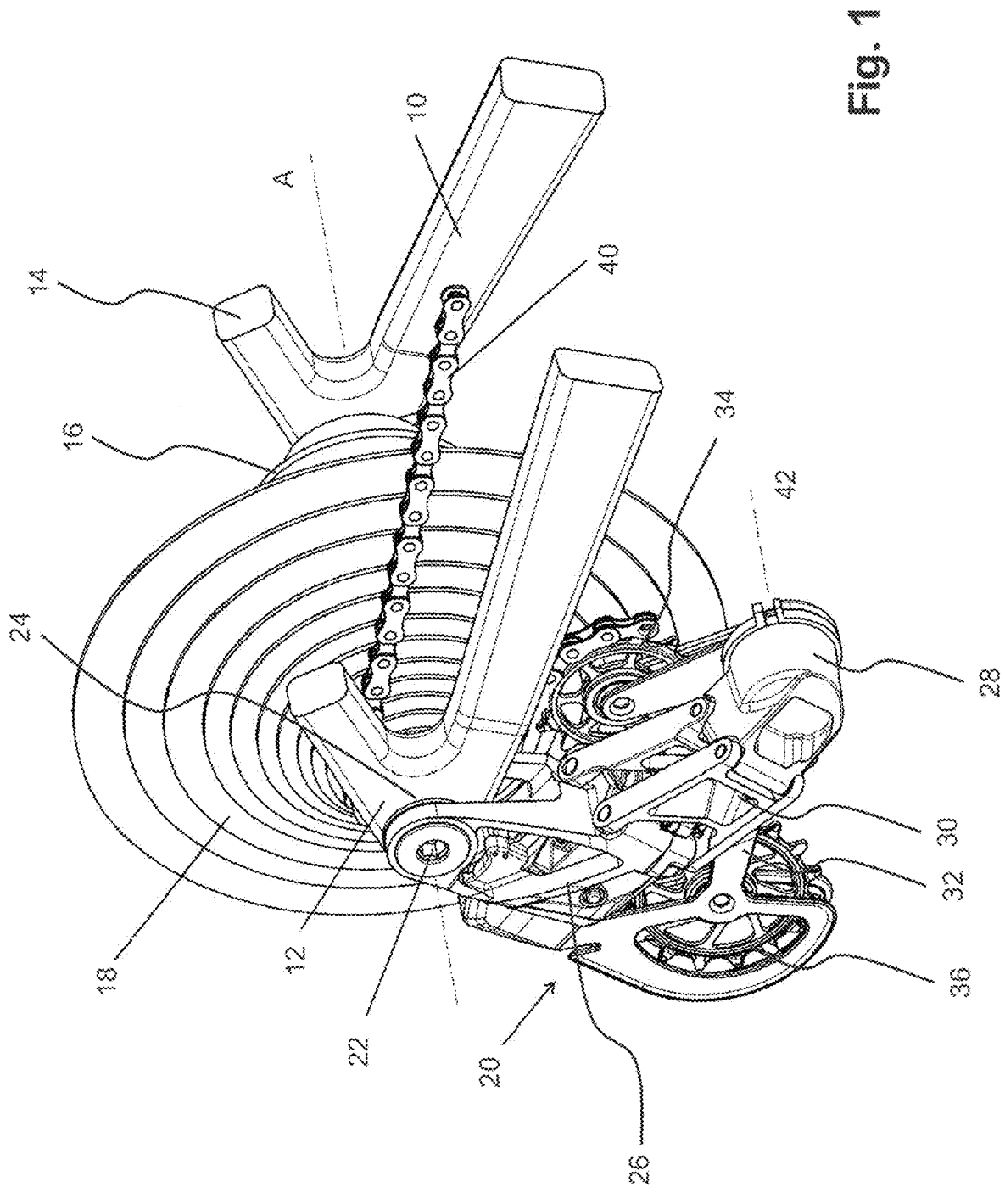
FIG. 1 shows a schematic part-illustration of a rear wheel arrangement having a schematically illustrated derailleur.

The present invention relates to a rear derailleur for a bicycle gearing system, comprising: a base element which can be fitted to a bicycle frame; and a movable element which is coupled to the base element by a pivot mechanism and which can be displaced relative thereto in a pivotably movable manner, wherein the pivot mechanism is pivotably movable both relative to the movable element and relative to the base element.

The present invention further relates to a method for assembly and adjustment of such a derailleur.

An object of the present invention is to provide a rear derailleur of the type described in the introduction and a method for the assembly or adjustment thereof in which the blocking device is configured to be better integrated and less exposed with respect to previous solutions.

This object is achieved by a rear derailleur for a bicycle gearing system which comprises: a base element which can be fitted to a bicycle frame; and a movable element which is coupled to the base element by a pivot mechanism and which can be displaced relative thereto in a pivotably movable manner, wherein the pivot mechanism is pivotably movable both relative to the movable element and relative to the base element. Furthermore, according to the invention, there is provided a blocking device which is configured to at least temporarily secure the movable element relative to the base element, wherein the blocking device is configured in such a manner that the pivot mechanism can be temporarily secured by a direct coupling relative to the base element or relative to the movable element in at least one predetermined blocking position.

In contrast to the provisions of the prior art, the blocking device is configured in such a manner that it engages directly on the pivot mechanism and secures it relative to the base element or relative to the movable element by a direct coupling between two of these components. The pivot mechanism is according to the invention configured between the base element and the movable element. A blocking of the pivot mechanism relative to the base element or the movable element by a direct coupling ensures a secure temporary securing of the derailleur in a predetermined position or assembly position. It is completely sufficient for one of the pivot joints to be directly blocked between a component of the pivot mechanism and optionally the base element or the movable element counter to a pivot movement, that is to say, via the direct coupling. The entire pivot mechanism and consequently the derailleur is then secured in a desired blocking position. This is advantageous, in particular with purely mechanical derailleurs, since the derailleur can thereby be temporarily blocked in a desired assembly position counter to the action of a pretensioning spring. The integrated construction of the base element, pivot mechanism and movable element enables the blocking device to be configured in a simple, unobtrusive and less exposed manner compared with solutions from the prior art. This has advantages with regard to avoiding possible impairment as a result of external actions (stone chipping, contamination, etcetera) and also with regard to avoiding an unintentional activation of the blocking device. This becomes clear, in particular taking into account the specific further developments described below, which represent only exemplary embodiments.

According to a variant of the invention, there is provision for the pivot mechanism to comprise at least two pivot arms, wherein a first pivot arm is pivotably coupled to the base element with the first end portion thereof and pivotably coupled to the movable element with the second end portion thereof, wherein a second pivot arm is pivotably coupled to the base element with the first end portion thereof and pivotably coupled to the movable element with the second end portion thereof. With such a configuration of the pivot mechanism as a parallelogram gear mechanism, it is sufficient, as already indicated above, for only one of the two pivot arms to be blocked relative to the base element or relative to the movable element. The entire parallelogram gear mechanism, or the entire pivot mechanism of the derailleur, is thereby blocked in a predetermined position.

According to a variant of the invention, there may be provision for the base element and/or the movable element to have a first receiving opening and for the pivot mechanism to have on a component a second receiving opening, wherein the first and second receiving openings in at least one predetermined relative position of the movable element are orientated with respect to each other relative to the base element in such a manner that, in the event of an at least partial alignment of the first and second receiving openings, a blocking member can be introduced therein in order to produce the direct coupling in order to block a pivot movement of the movable element relative to the base element via the pivot mechanism.

This variant enables a particularly simple configuration of the blocking device. Simply by providing two receiving openings which can be brought into alignment with each other so that a blocking member can be introduced therein, a blocking of the derailleur can be achieved without significant technical complexity and even achieving a specific weight advantage. A metal or plastics material pin or a tool can be used as a blocking member, such as in particular a screwdriver, a hexagon key, or the like. The blocking member can be left in the two receiving openings as long as the blocking is required for assembly and for adjustment of the derailleur. The blocking member can then be removed simply by being pulled out of the receiving openings.

With regard to the embodiment mentioned above, this means that the base element and/or the movable element has/have a first receiving opening and that the first pivot arm and/or the second pivot arm has/have a second receiving opening, wherein the first and second receiving openings are orientated in at least one predetermined relative position of the movable element with respect to each other relative to the base element in such a manner that, in the event of an at least partial alignment of the first and second receiving openings, a blocking member can be introduced therein in order to produce the direct coupling in order to block a pivot movement of the movable element relative to the base element via the pivot mechanism.

Furthermore, in this context there may be provision for at least one of the first and second receiving openings to be formed with a torsion-resistant receiving profile, in particular with a hexagonal profile. This enables a predetermined blocking position to be defined in that the profiled receiving opening is quite specifically configured in terms of its profile or diameter for a specific blocking member.

Furthermore, a variant of the invention makes provision that, as a result of the provision of at least two differently sized blocking members which, in order to produce the direct coupling, can be fitted in the at least partially aligned first and second receiving openings, the rear derailleur can be temporarily secured in at least two predetermined blocking positions.

Assuming that a fitter uses the adapted blocking member with a predetermined profile and diameter, it is ensured that the derailleur is blocked in the desired blocking position, for example, a specific orientation relative to a sprocket cassette, such as, for example, the 6th or 7th sprocket of the cassette. A predetermined orientation of the derailleur for assembly and for adjustment of the chain tension can thereby be ensured. Furthermore, there may thereby be provision, for example, by using a hexagon key which is adapted to the hexagonal profile, and by using a predetermined additional hexagon key of a smaller size, for two blocking positions which take into account the problem set out above to be able to be predefined, according to which in accordance with the respective bicycle category (hardtail or fully spring-mounted with rear wheel suspension) the appropriate blocking position in each case is selected, that is to say, by using the respective hexagon key of a predetermined size. Again, simply by appropriate configuration of the receiving openings, in particular the profiled receiving opening using simple means, a reliable specification of the blocking position can be ensured.

According to a variant of the invention, there may be provision for the derailleur to be in the form of a cable-operated purely mechanical derailleur, wherein at least one of the pivot arms is constructed with or in the form of an extension arm for fitting a cable pull, wherein the extension arm is preferably configured with the second receiving opening. With this measure, one of the receiving openings can be produced in a particularly advantageous manner with few components and with a weight saving being achieved.

Furthermore, as an alternative, there may be provision for the derailleur to be in the form of a motor-activated derailleur, wherein the drive motor and a drive gear mechanism which is associated therewith is arranged at least partially on the base element. Even if a motor-activated derailleur is generally moved by appropriate control of the motor or the drive mechanism into any predetermined position and can be retained therein, it may be advantageous to also associate a blocking device of the type described above therewith in order to secure the derailleur in the desired assembly position in a temporary, reliable manner.

An alternative variant of the invention may involve the blocking device having a blocking pin which is fitted to one of the components base element or first pivot arm or second pivot arm or movable element and, in order to temporarily secure the derailleur in the at least one blocking position, directly coupling the base element or the movable element to the second pivot arm in order to avoid a pivot movement. In contrast to what has been described above, this variant of the invention makes provision for no additional blocking member to be required. The blocking device is operated via the activation of the blocking pin. This corresponds with regard to the configuration of the blocking device itself substantially to the solution according to document DE 10 2021 003 745 A1, wherein, as already set out in the introduction, the blocking device is provided in a state exposed between the movable element and the chain guiding arrangement. This blocking device from the prior art fulfils a completely different purpose from the blocking device of the present invention. According to the present invention, the blocking device which comprises the blocking pin is provided in the region of the pivot mechanism for direct coupling to the base element or the resilient element and is integrated in the rear derailleur in order to position it relative to a reference sprocket.

In connection with this blocking device which has a blocking pin, a further development of the invention makes provision for the blocking pin to be resiliently pretensioned into a blocking-free passive position or to be able to be locked therein. Where applicable, for locking, a catch or a locking projection which cooperates with a recess or the like, may be provided. The blocking pin can thus be locked in its passive position in order to prevent it from blocking the derailleur in an undesirable and untimely manner during operation as a result of external influences or incorrect operation.

Furthermore, in this context there may be provision for the blocking pin to have a cross sectional profile which differs from a circle and/or to be supported in an eccentric manner so that it can be fitted in at least two different relative positions relative to one of the components of the base element or first pivot arm or second pivot arm or movable element in order to achieve at least two different blocking positions. Consequently, the blocking pin can be moved into different blocking positions. Again, the problem can consequently be taken into account that, in order to assemble the derailleur depending on the bicycle category (hardtail or fully spring-mounted), different blocking positions relative to the sprocket cassette are required.

According to a variant of the invention, there may be provision, in order to produce the direct coupling, for a pivotable, preferably resiliently pretensioned blocking member to be arranged about one of the pivot axles of the pivot mechanism, wherein, so as to overcome the resilient pretensioning, it can preferably be pivoted between a passive position and at least one blocking position about the associated pivot axis, wherein the blocking member in the passive position permits the relative movement between the base element and the movable element via the pivot mechanism and wherein the blocking member in the at least one blocking position provides a direct coupling between the base element or the movable element and the pivot mechanism. This variant enables the blocking member to be permanently integrated in the derailleur and where necessary to be pivoted back and forth between the passive position and the blocking position.

A further development of the invention relates to a rear derailleur of the type described above, having a chain guiding arrangement which is coupled to the movable element and which can be pivoted relative thereto about a pivot axis and a pretensioning device, by which the chain guiding arrangement is pretensioned relative to the movable element about the pivot axis into a starting position, wherein the chain guiding arrangement can be pivoted counter to a tensioning force of the pretensioning device from the starting position about the pivot axis into different operating positions.

In this instance, there may further be provision for the chain guiding arrangement together with the pretensioning device to be combined to form a sub-assembly which can be fitted by a releasable connection, preferably a threaded connection, to the movable element. This configuration of the chain guiding arrangement together with the pretensioning device to form a sub-assembly enables a modular construction of the rear derailleur. Another advantage involves, in the event of a defect in the chain guiding arrangement or in the pretensioning device, the entire rear derailleur not having to be replaced, but instead only the sub-assembly being able to be replaced. Particularly in these components, defects regularly occur as a result of external influences or impacts. The coupling of this sub-assembly to the movable element by a releasable connection, in particular by a threaded connection, enables a particularly simple and tool-free assembly. Where possible, during a bicycle tour in the countryside, a change of the sub-assembly can thus be rapidly carried out.

The invention further relates to a rear derailleur of the type described in the introduction or above, wherein the pretensioning device has a damping arrangement which is configured to counteract a damping effect of a relative movement between the movable element and the chain guiding arrangement, wherein the damping arrangement comprises a coupling device, via which the damping arrangement is coupled to a rotary shaft and a support, wherein the coupling device has a damping spring which is supported, on the one hand, on the rotary shaft and, on the other hand, on an insertion portion which is or can be coupled to the movable element and which between them via a frictional engagement develops its damping action, preferably in a radial direction. It should be noted that the damping arrangement according to the type mentioned above and specified in greater detail below should also be considered to be a separate aspect of the invention regardless of the blocking device.

According to a further development of the damping arrangement according to the invention, there may be provision for the damping spring to be fitted in a rotationally secure manner with one end to one of the components rotary shaft and movable element and to be directly or indirectly in frictional engagement with the other component rotary shaft and movable element, preferably in radial frictional engagement, wherein the damping effect increases or decreases depending on the direction of the relative rotation.

It is, for example, possible for the damping spring to be configured with a smaller inner diameter than a circumferential face of a shaft portion of the rotary shaft which cooperates therewith. During the assembly, the damping spring is widened slightly and expanded on this circumferential face of the shaft portion so that it is consequently in radial frictional engagement with this circumferential face of the shaft portion. If the damping spring is in the form of a helical spring with a plurality of windings, the tensioning state thereof changes depending on the direction of the relative rotation between the rotary shaft and the movable element. In one rotation direction, the damping spring which is in the form of a helical spring is tendentially more highly tensioned, whereas in the opposing direction of the relative rotation there is instead tendentially brought about an expansion of the damping spring. Depending on the direction of the relative movement between the movable element and the chain guiding arrangement, a greater or lesser damping effect can thereby be achieved. For example, undesirable vibrations of the chain guiding arrangement in one direction can thereby be more powerfully damped in a direction relative to the movable element.

With this structure, a simply constructed damping arrangement with advantageous properties can further be achieved with regard to the force transmission with little structural spatial requirement.

A further development in this context makes provision for the damping spring to have a maximum number of four windings, preferably a maximum number of three windings, more preferably a maximum number of two windings. Furthermore, in this context, there may be provision for the insertion portion to be made from metal, preferably from steel. The damping spring may cooperate with a spacer ring.

Furthermore, with regard to the damping device, there may be provision for a first resilient force storage device to be coupled via the rotary shaft to the chain guiding sub-assembly in order to apply the pretensioning force via the rotary shaft to the chain guiding sub-assembly.

Furthermore, it is in this instance possible for the rotary shaft to be rotatably supported by means of a rotary bearing on a covering element which, together with the rotary shaft which extends through a through-opening of the covering element, closes the receiving member of the movable element and is secured to the movable element.

As already set out in the introduction, the derailleur according to the invention may be configured for coaxial assembly on a rear wheel axle of a bicycle, wherein the base element comprises a first connection end for coaxial assembly on the rear wheel axle and a second connection end for coupling to a pivot mechanism. In this context, there may be provision according to the invention for the first connection end of the base element to have a first arm and a second arm which are arranged spaced apart from each other in an axial direction, wherein in the state mounted on the frame the first arm is located at an axial inner side of the frame and the second arm is located at an axial outer side of the frame.

Furthermore, it is possible for the second connection end of the base element to have a first axle receiving member for a first pivot axle of the pivot mechanism and a second axle receiving member for a second pivot axle of the pivot mechanism, wherein the first axle receiving member and the second axle receiving member—and consequently the respective pivot axles—are orientated in each case substantially orthogonally with respect to the rear wheel axle.

If the derailleur comprises an electromechanical drive, there may be provision for it to be arranged in the region of the base element.

The invention further relates to a method for adjusting a bicycle drive comprising a rear derailleur of the type described above, a multiple sprocket arrangement, a front chain ring and a chain, wherein the rear derailleur is adjusted relative to the multiple sprocket arrangement, having the following steps of:

(a) determining a bicycle category, in particular determining whether the bicycle has a non-spring-mounted or spring-mounted rear wheel, on which the derailleur is intended to be assembled, (b) selecting a blocking member which is adapted to the specific bicycle category or selecting a blocking position, which is adapted to the specific bicycle category, of a blocking member, (c) depending on the specific bicycle category, moving the derailleur counter to the action of the tensioning spring in an orientation with respect to a reference sprocket, in particular to one of the central sprockets of the multiple sprocket arrangement, preferably to the sixth or seventh sprocket of the sprocket cassette, in such a manner that the chain is in engagement with the reference sprocket, and in particular in such a manner that the first receiving opening is in alignment with the second receiving opening, (d) inserting or adjusting the blocking member into the active position so that it secures the pivot mechanism relative to the base element, (e) turning the derailleur backwards about the rear wheel axle until the desired chain tension is achieved, (f) fixing the derailleur to the frame after achieving the desired chain tension, and (g) removing the blocking member from the openings and/or moving the blocking member into the passive position thereof.

By carrying out this method with the derailleur according to the invention, a precise orientation of the derailleur relative to the sprocket cassette and achieving the desired chain tension is permanently ensured.

Direction indications are used below, that is to say, "front/rear", "outer/inner", "top/bottom" and "left/right" which relate to a bicycle which is orientated and used in a travel direction. A bicycle frame 10 has a left and a right rear dropout 12, 14 between which there is mounted a rear wheel which is not shown here and which has a hub 16 on which a sprocket cassette 18 is fitted for drive coupling. The rear wheel rotates with the sprocket cassette 18 about the rear wheel axle A. The sprocket cassette 18 is schematically illustrated and rotates about the rear wheel axle A. Such a sprocket cassette 18 may, for example, comprise twelve sprockets, wherein the smallest sprocket has ten teeth and the largest sprocket has 52 teeth.

It is further possible to see a derailleur 20 which is mounted on the right dropout 12. The derailleur 20 is mounted coaxially with the rear wheel axle A and extends in such a manner that it is fitted by means of a securing arrangement 22 to the axle hanger 24 of the bicycle frame 10. The derailleur 20 has a multi-component base element 26, a movable element 28 and a pivot mechanism 30 which is arranged therebetween. A chain guiding arrangement 32 which has two guide rollers 34 and 36 is fitted to the movable element 28 in a pivotably movable manner.

For switching, the movable element 28 can be pivoted relative to the base element 26 via the pivot mechanism 32 transversely relative to the longitudinal frame axis. When switching from a larger sprocket to a smaller sprocket, the rear derailleur 20 moves a partially shown chain 40 axially outwards (outboard). When switching from a smaller sprocket to a larger sprocket, the rear derailleur 20 moves the chain 40 axially inwards (inboard). The term axially relates to the rear wheel axle A or the rotation axis A of the sprocket cassette 18, the sprocket which is largest in terms of its diameter is located axially further inwards than the smaller sprocket. The teeth are arranged radially outwards on the sprockets. The chain 40 runs through the chain guiding arrangement 32 in an S-shaped manner and is in engagement with the teeth of the upper guide roller 34 and the teeth of the sprocket cassette 18 which are not shown here.

The bicycle drive which is shown in FIG. 1 comprises a front single chain wheel which is not shown in this instance, the sprocket cassette 18, the chain 40 and the rear derailleur 20. From a switch which is mounted on the handlebar (not shown in this instance), switching commands are mechanically or electronically transmitted to the derailleur 20. The transmission of the switching commands from the switch to the derailleur 20 can be carried out in a cable-free or wireless manner or in a cable-bound manner or via a cable.

Figure 3:
FIG. 3 shows a side view of the first exemplary embodiment of the derailleur according to the invention when viewed from the right side of the bicycle.
Figure 3:
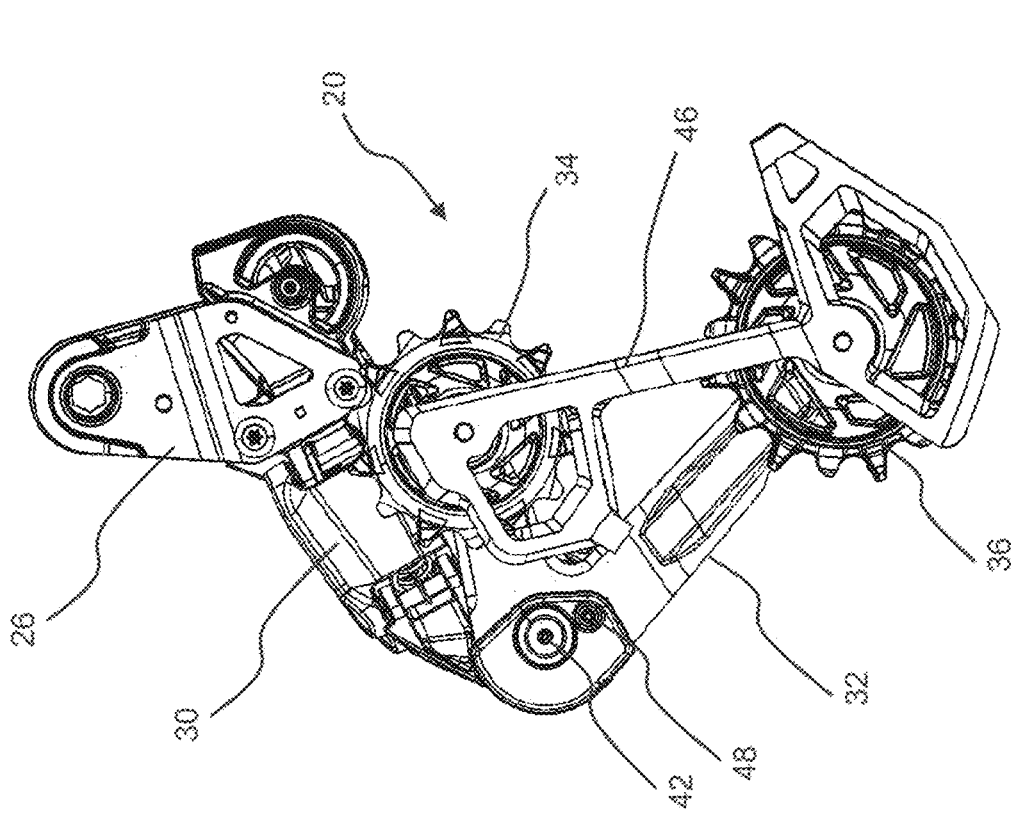
Figure 2:
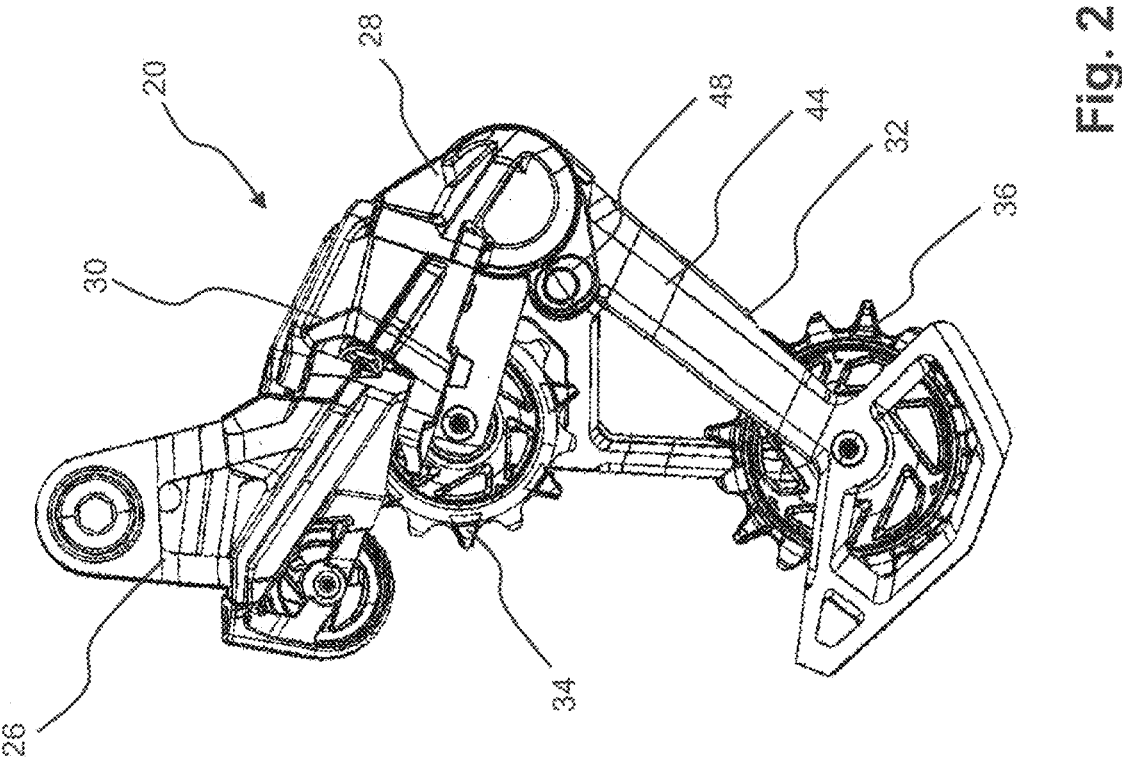
FIG. 2 shows a side view of a first exemplary embodiment of a derailleur according to the invention when viewed from the left side of the bicycle.
Figures 4, 5:
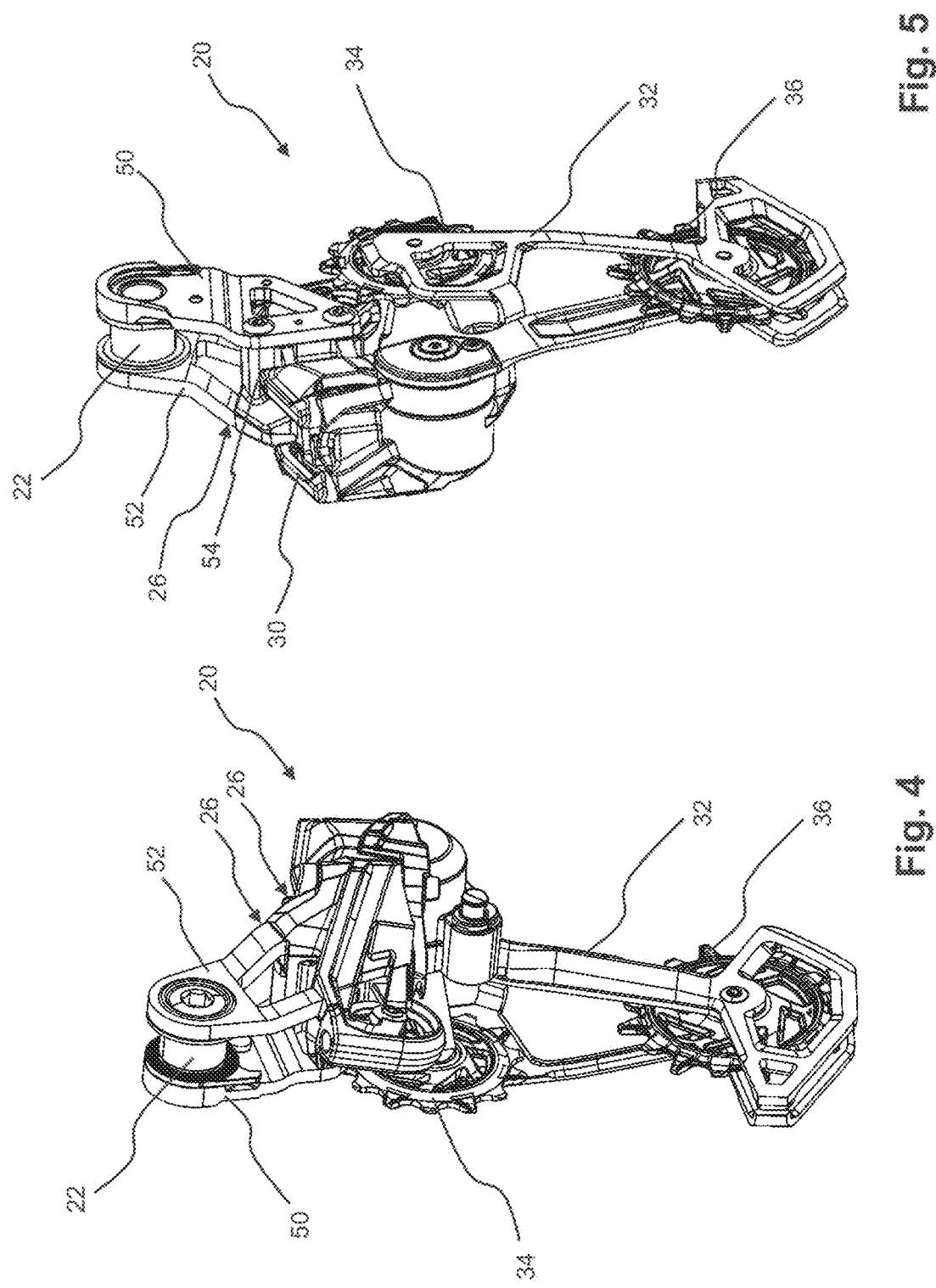
FIG. 4 shows a perspective view of the derailleur according to FIGS. 2 and 3 when viewed obliquely from the rear.
FIG. 5 shows a perspective view of the derailleur according to FIGS. 2 and 3 when viewed obliquely from the front.
Figure 7:
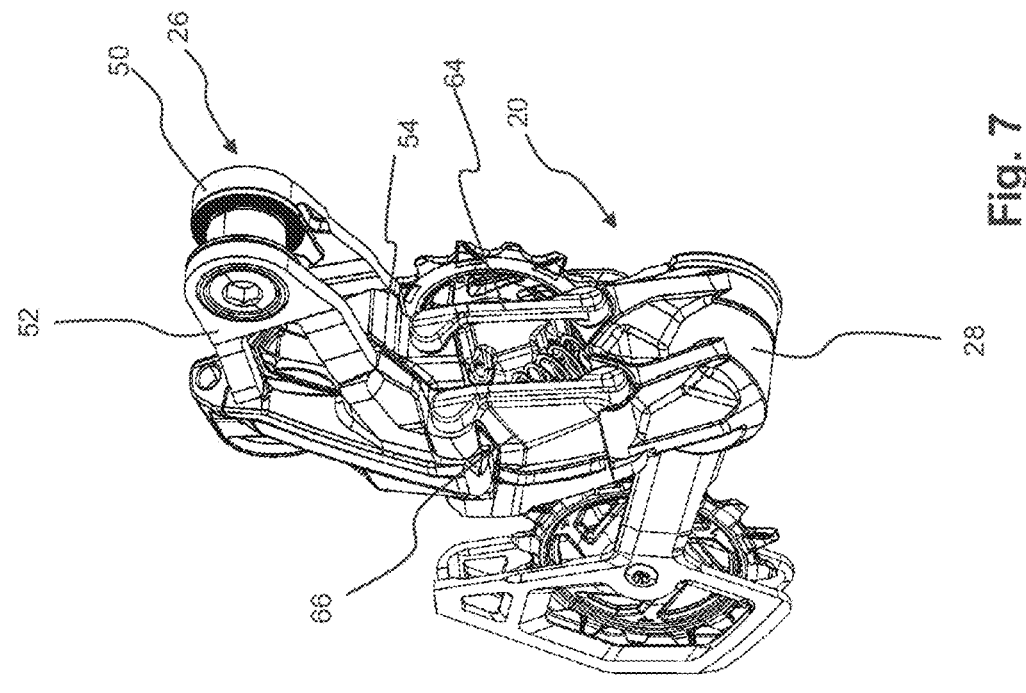
FIG. 7 shows a perspective view of the derailleur according to FIGS. 2 and 3 when viewed obliquely from above.
Figure 6:
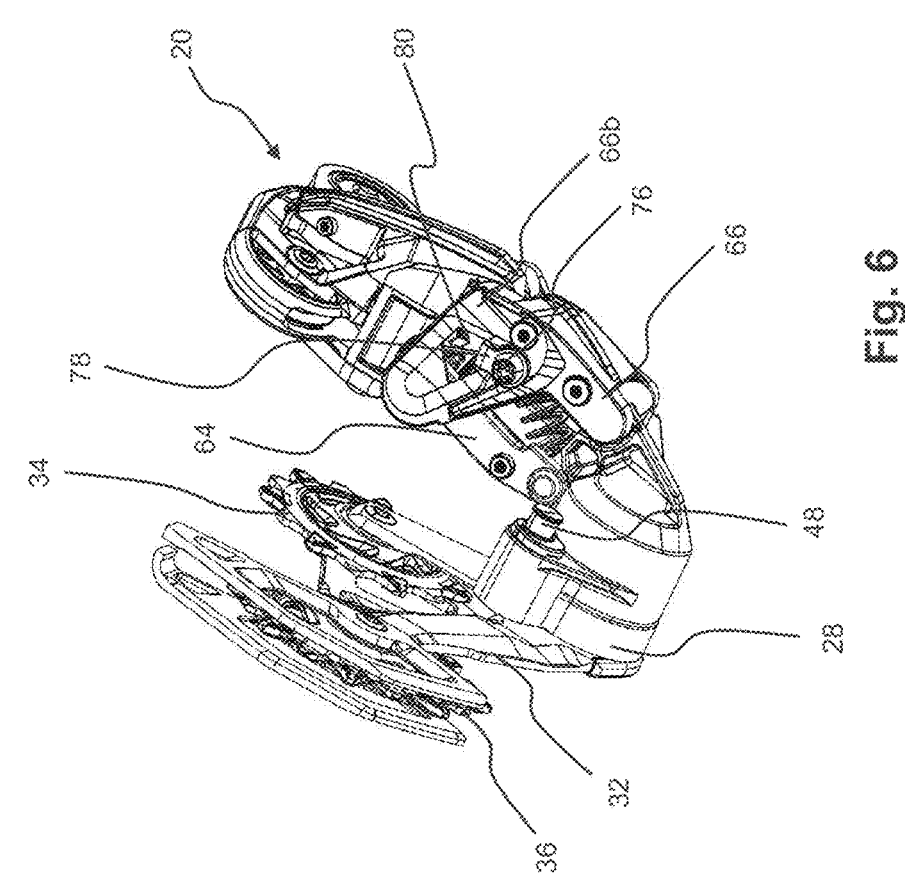
FIG. 6 shows a perspective view of the derailleur according to FIGS. 2 and 3 when viewed obliquely from below.

FIG. 2 shows only the derailleur 20 as the external view. FIG. 3 shows the derailleur 20 as an internal view. The coaxial assembly of the derailleur 10 by means of pins 22 along the rear wheel axle A or the B axle of the base element 26 saves the use of a derailleur hanger as generally used in the prior art.

The cable guiding arrangement 32 is connected to the movable element 28 so as to be able to be rotated about the pivot axis 42 (P axis) and pretensioned towards the rear in a clockwise direction so that the chain is tensioned counter to the action of this pretensioning. The chain guiding arrangement 32 comprises the upper and lower guide roller 34, 36 which are each rotatably supported between two cage sheets 44, 46. The upper guide roller 34 is rotatably arranged with an upper spacing from the axis 42. The lower guide roller 36 is rotatably arranged with a lower spacing from the P axis 42, wherein the upper guide roller 34 is arranged with a smaller spacing from the P axis 43 than the lower guide roller 36.

It is possible to see in this variant an optional blocking device 48 (flip chip) which may be provided to secure the pretensioned chain guiding arrangement 32 with respect to the movable element 28. The derailleur 20 can thus be mounted and adjusted without the chain guiding arrangement 32 snapping backwards as a result of the pretensioning. For the chain tension adjustment, this is not necessarily required, but may be advantageous particularly during assembly. For details of this optional blocking device 48, reference may be made to the disclosure of document DE 10 2021 003 745 A1.

The derailleur 20 comprises a multi-component base element 20, a movable element 40, a chain guiding arrangement 90 and a pivot mechanism 30 which connects the base element 20 to the movable element 40.

With regard to the perspective views according to FIGS. 4 to 7, it can be seen that the base element 26 is configured in a fork-like manner in the upper region thereof for fitting to the bicycle frame, also referred to as a B knuckle. It has an inner fork portion 50 and an outer fork portion 52. The inner fork portion 50 at the frame inner side moves into engagement with the rear dropout 12, whereas the outer fork portion 52 on the frame at the outer side moves into engagement with the rear dropout 12. It is also possible to see the screwed-in securing pin of the securing arrangement 22, the various sleeves and positioning components 22a, 22b and 22c. The two fork portions 50 and 52 are not made from solid material but instead with various struts and recesses to save weight and for reinforcement. The two fork portions 50, 52 are further screwed to a connection member 54 of the base element 26 at both sides. To this end, screw elements 56, 58, 60, 62 are provided. The connection member 54 serves to support the pivot mechanism 30.

With regard to the pivot mechanism 30, it can be seen that it has two pivot arms 64, 66. The pivot arms 64, 66 are made in several pieces. The pivot arm 64 which is arranged at the inner side has two components 64a and 64b which in the mounted state are connected to each other by two securing screws 68 and 70. The pivot arm 66 has two components 66a and 66b which in turn are screwed to each other by two securing screws 72, 74. The component 66b is additionally configured for fitting an actuation cable (not shown) via a securing screw 76 and a tensioning sheet 78. It can be seen that the component 66b is configured for cable guiding in a substantially triangular manner and has a polygonal opening 80. This will be further set out below.

It is further possible to see the movable element 28. The connection member 54 of the base element 26, the two pivot arms 64 and 66 and the movable element 28 each have bearing openings in which connection axles 82, 84, 86, 88 can be inserted and partially fixed. The pivot mechanism 30 can thereby be combined to form a parallelogram gear mechanism. It is thereby possible, with a base element 26 which is fixed with respect to the frame and consequently with a connection member 54 which is accordingly fixed with respect to the frame to achieve a pivoting of the movable element 28 via the pivot mechanism 30. The pivoting is carried out counter to the resilient action of a tensioning spring 90 which is suspended on both connection axles 82 and 88 and is retained in each position with pretensioning. This tensioning spring 90 ensures a resilient pretensioning in the derailleur 20 in such a manner that the chain guiding arrangement 32 is pretensioned outwards so that it is orientated when completely released relative to the smallest sprocket of the sprocket cassette 18. Each switching operation in an inward direction, that is to say, towards the next largest sprocket, is carried out counter to the increasing pretensioning of the tensioning spring 90.

On the movable element 28, a substantially circular-cylindrical receiving housing portion 92 which is constructed to be substantially hollow at the interior thereof is provided. This housing portion 92 receives a pretensioning device 94 which is formed on the chain guiding arrangement 32 with an integrated damping device 96. Via this pretensioning device 94 with an integrated damper device 96, the chain guiding arrangement 32 is received in the receiving housing portion 92 so as to be able to be rotated about the axis 42 and fitted to the movable element 28. In this instance, it should be taken into account that the pretensioning device 94 ensures that the chain guiding arrangement 32 is pretensioned towards the rear with the lower guide roller 36 thereof and, when released, pivots backwards relative to the bicycle frame. The chain tension already mentioned above is thereby ensured.

Figure 8:
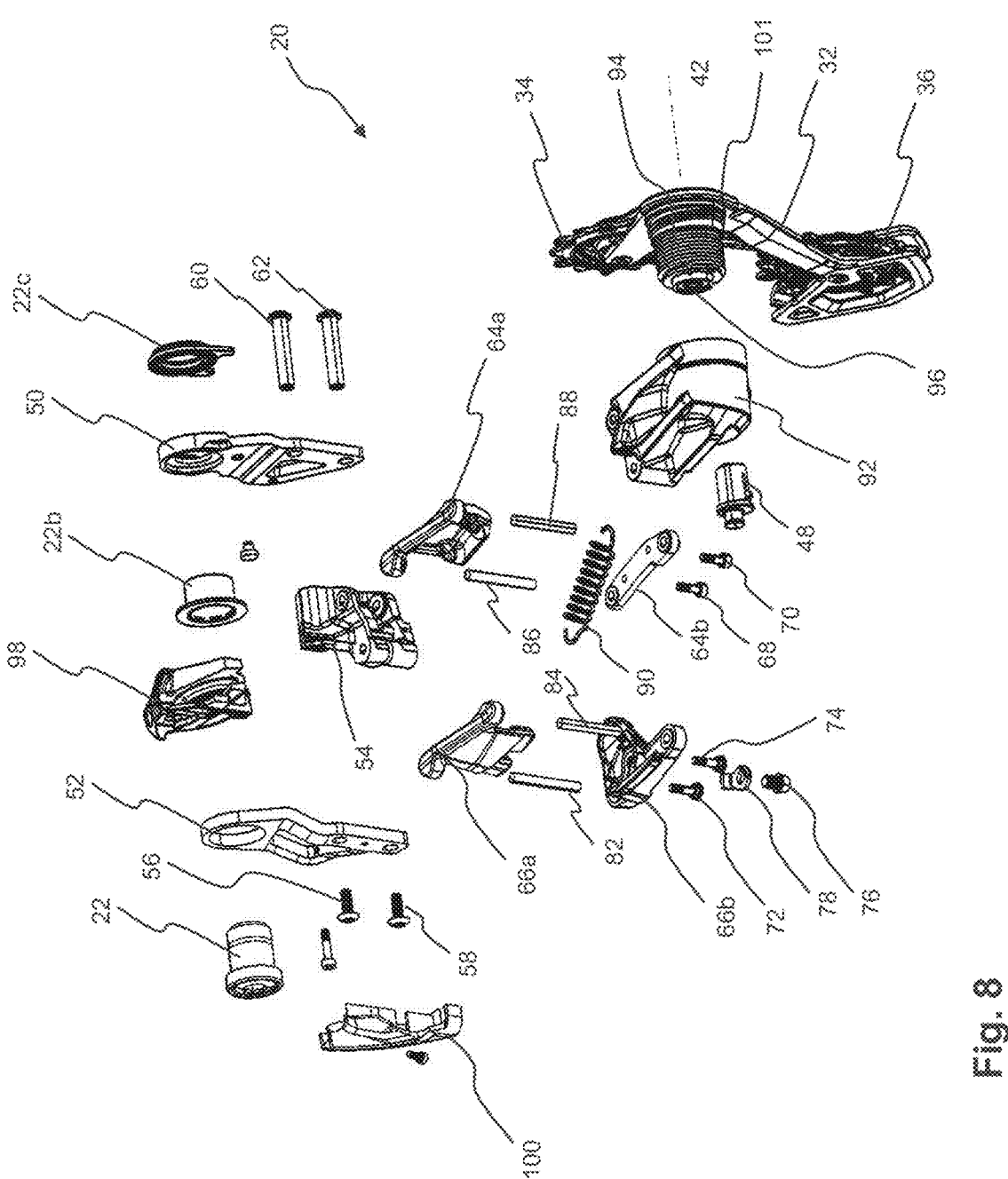
FIG. 8 shows an exploded view to illustrate the individual components of the derailleur according to FIGS. 2 to 7.

Taking into account the exploded view according to FIG. 8, it is further possible to see the additional components 98 and 100 which are fitted to the base element 26. The component 98 serves to guide the cable. The component 100 is a lateral cover. Furthermore, the sub-assembly comprising the chain guiding arrangement 32, pretensioning device 94 and integrated damper device 96 can be pre-assembled in the form shown and screwed via an outer thread 101 into an inner thread portion which is not shown in the receiving housing portion 92. This enables a simple tool-free assembly of the sub-assembly on the movable portion 28, where applicable for replacement in the event of damage.

Figure 9:
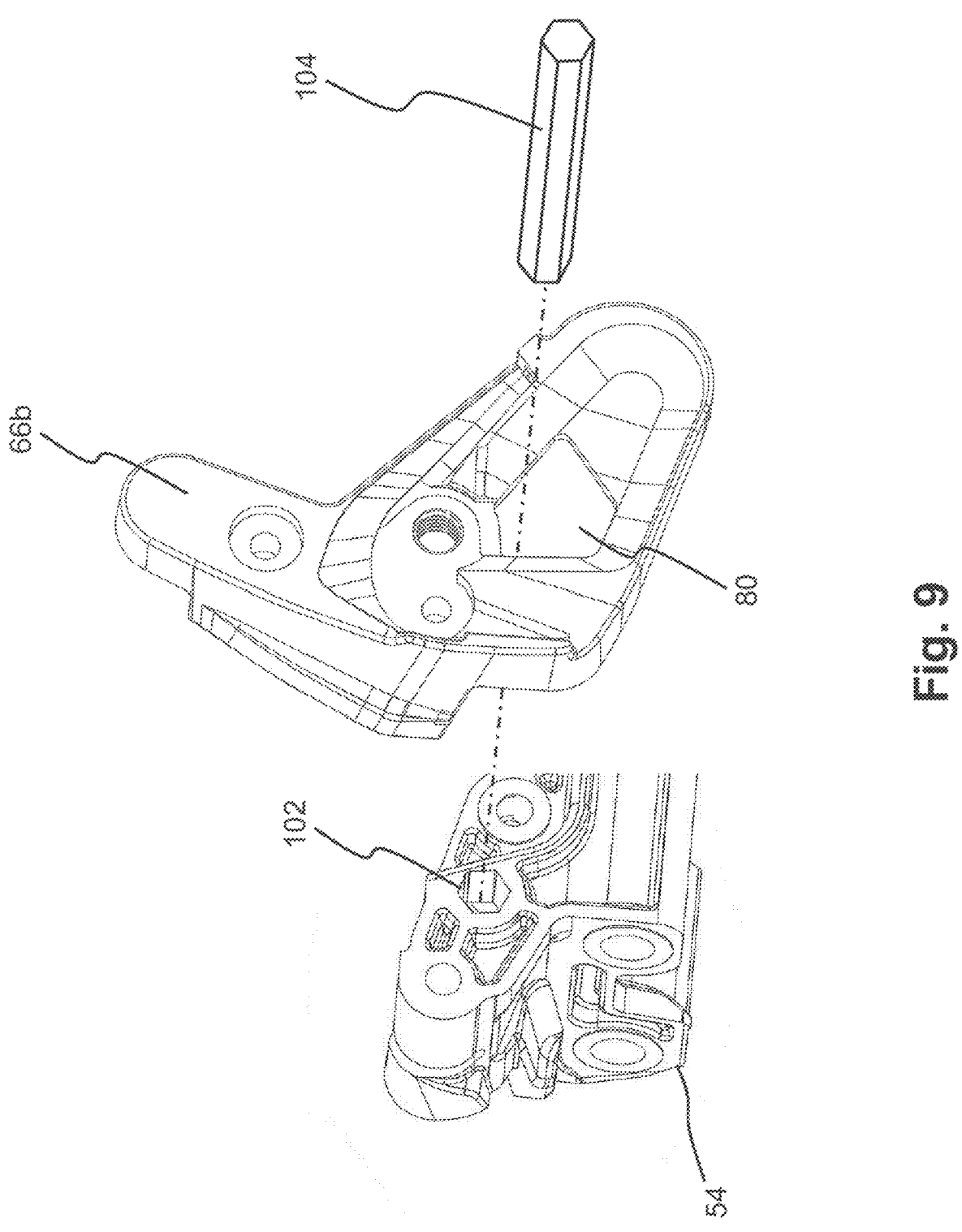
FIG. 9 shows an illustration of a component of the base element and a component of the pivot mechanism in order to explain a first variant of the blocking device.
Figures 10, 11, 12:
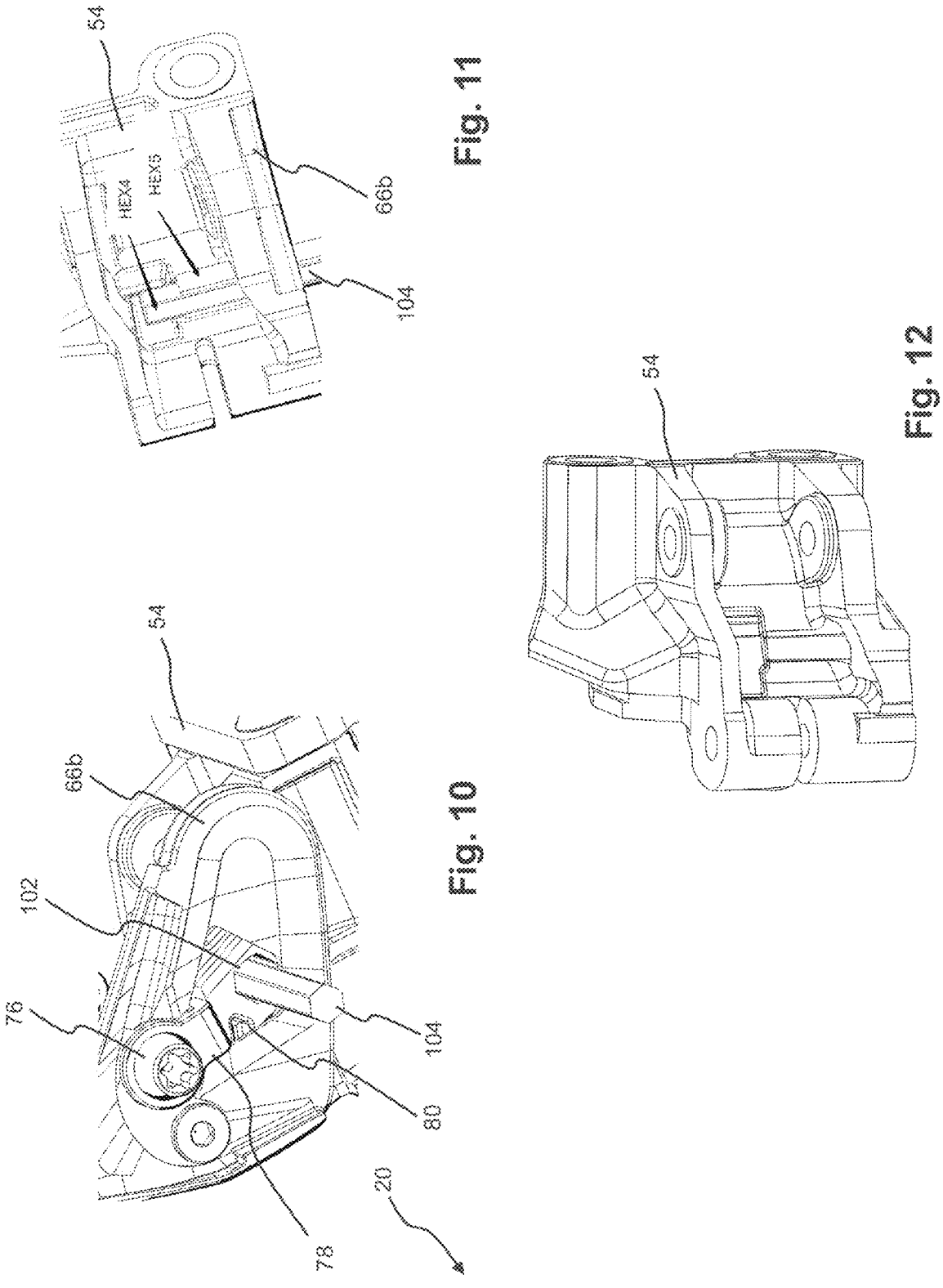
FIG. 10 shows an illustration relating to the operating method of the first variant of the blocking device.
FIG. 11 shows an illustration relating to the operating method of the first variant of the blocking device.
FIG. 12 shows an illustration relating to the operating method of the first variant of the blocking device.

With regard to the blocking device according to the invention, FIG. 9 shows the component 66b of the pivot arm 66 and the connection member 54 of the base element 26. These two components are configured in such a manner that they afford the possibility of blocking the derailleur in at least one predetermined blocking position. To this end, the connection member has a hexagonal opening 102. The component 66b of the pivot arm 66 has, as already set out above, a polygonal opening 80. In the assembled state, the opening 80 can be orientated by pivoting the movable element 28 relative to the base element 26 via the pivot mechanism 30 and counter to the action of the tensioning spring 90 in such a manner relative to the hexagonal opening 102 that they are at least partially in alignment or overlap. In this state, as shown in FIGS. 10 and 11, a hexagon key 104 can be inserted through the opening 80 into the hexagonal opening 102. If the movable element 28 is then released again, the hexagon key 104 which is inserted into the hexagonal opening 102 comes into contact with the edge of the polygonal opening 80 and blocks a further resilient-pretensioning-related restoring movement of the movable element 28 relative to the base element 26 counter to the action of the tensioning spring 90. The derailleur 20 is thereby secured in a predetermined relative position between the base element 26 and movable element 28 with resilient pretensioning of the tensioning spring 90. This predetermined relative position is defined in that the chain tension can thereby be adjusted in an optimum manner whilst the chain is located on a predetermined reference sprocket of the cassette 18.

The hexagonal opening 102 is sized in such a manner that it is adapted to a specific hexagon key size. For example, a hexagon key of the size HEX5 can be inserted in a positive-locking manner therein. In this instance, the derailleur 20 is, for example, for the assembly and the optimum adjustment of the chain tension adapted to a bicycle with no rear wheel suspension. If in contrast the derailleur 20 is intended to be fitted to a bicycle frame which is configured for a bicycle having rear wheel suspension, wherein the rear structure of the bicycle is constructed in a spring-mounted manner, a different position is required. The derailleur 20 can in this assembly position be secured by a hexagon key of the size HEX4 being used in place of a hexagon key of the size HEX5. This key can be inserted with play into the hexagonal opening 102. However, as soon as the derailleur moves into its starting position under the action of the tensioning spring 90, the hexagon key of the size HEX4 blocks the movement in the different predetermined assembly position for this bicycle category. Consequently, using one and the same hexagonal opening 102, by using differently sized blocking members two different assembly positions can be achieved, that is to say, relative to two different reference sprockets, so that an assembly of the derailleur 20 and ideal adjustment of the chain tension in bicycles of a different category is enabled.

In an optional modification, it is possible to configure the hexagonal opening 102 in a stepped manner, having a first opening portion which is closer to the polygonal opening 80 and which is adapted to the dimensions of a hexagon key of the size HEX5 and having a second opening portion which is further away from the polygonal opening 80 and which is adapted to the dimensions of a hexagon key of the size HEX4. It can thereby be even more reliably ensured that, even with the adjustment via the smaller hexagon key HEX4, the predetermined defined assembly position is retained in a secure and precise manner.

After the assembly and adjustment of the chain tension, the hexagon key which is used as the blocking member can then be simply removed again from both overlapping openings.

The principle of blocking the derailleur 20 in two different assembly positions with two differently sized hexagon keys is shown in greater detail in FIGS. 11 and 12. It can be seen that for comparison both hexagon keys of a different size are depicted in a superimposed state in the drawings. With reference to the size differences, it can be seen that a blocking in different assembly positions can thereby be achieved. FIG. 12 shows this again as another view, where both hexagon keys are shown in a superimposed state and are designated HEX4 and HEX5.

The adjustment of the chain tension is carried out in this embodiment of the invention on the derailleur 20 according to the following method, which is also shown in FIG. 25 as a flow chart:

Step S1: determining a bicycle category, for example, determining whether the bicycle is configured with a non-spring-mounted or spring-mounted rear wheel on which the derailleur 20 is intended to be mounted, Step S2: selecting a blocking member 104 which is adapted to the specific bicycle category in the form of a hexagon key selectively of the size HEX4 or HEX5, Step S3: depending on the specific bicycle category, moving the movable portion of the derailleur 20 counter to the action of the pretensioning spring 90 in orientation with a reference sprocket, in particular with respect to one of the central sprockets of the multi-sprocket arrangement, preferably in orientation with respect to the $6^{th}$ or $7^{th}$ sprocket of the sprocket cassette 18, so that the chain 40 is in engagement with the reference sprocket and in such a manner that the opening 102 is in alignment with the opening 80, Step S4: inserting the blocking member 104 in the active position so that it secures the pivot mechanism 30 relative to the base element 26, Step S5: turning the derailleur 20 backwards about the rear wheel axle (A) until the desired chain tension is achieved, Step S6: fixing the derailleur to the frame after reaching the desired chain tension, and Step S7: removing the blocking member 104 from the openings 80 and 102.

In connection with this method, there may be provision for the blocking device 48 (see FIGS. 2 and 3) to be intermittently activated in order to block a relative movement of the chain guiding arrangement 32 relative to the movable element 28. This facilitates the assembly.

Figures 13, 14, 15, 16:
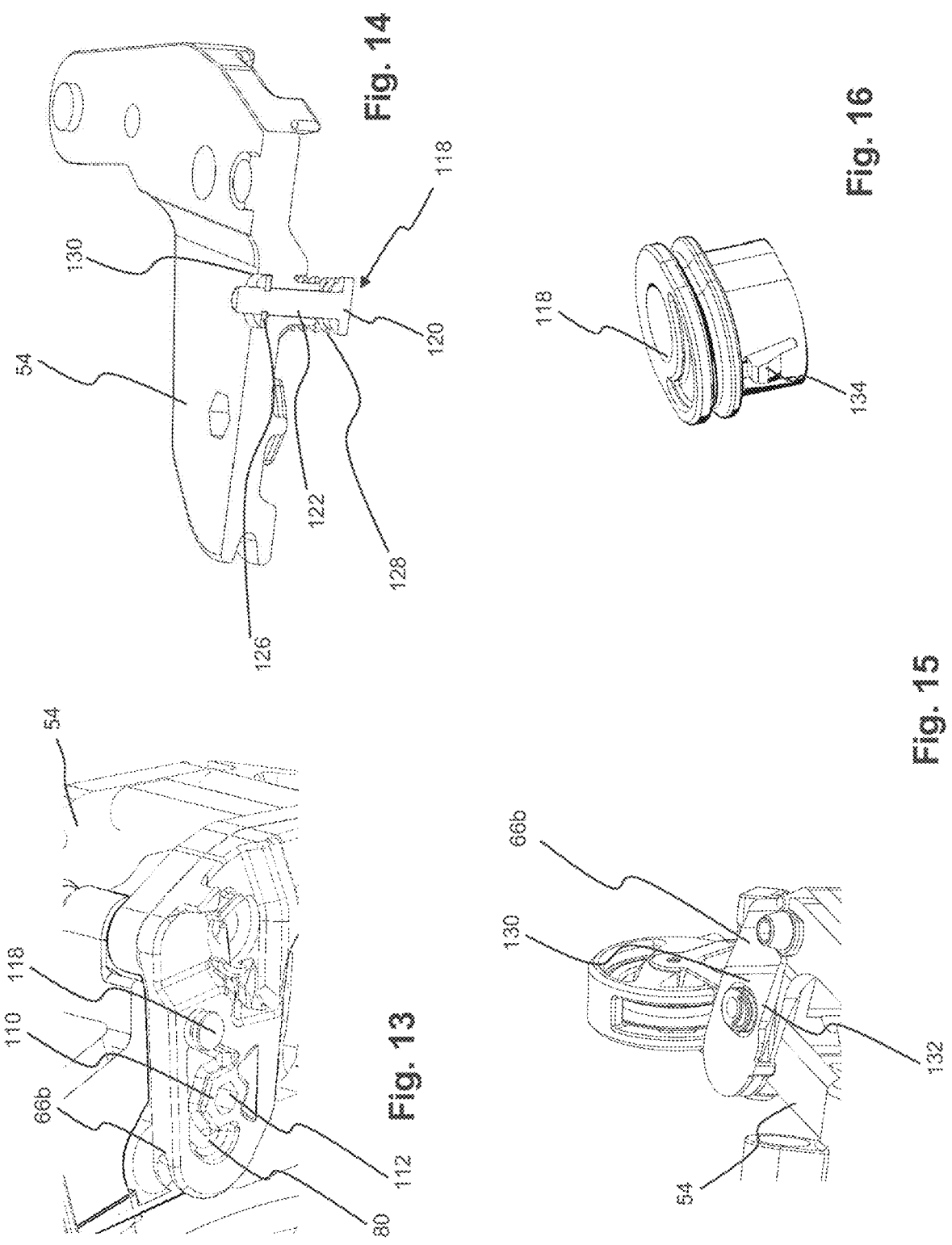
FIG. 13 shows an illustration relating to a second variant according to the invention of the blocking device.
FIG. 14 shows an illustration relating to a second variant according to the invention of the blocking device.
FIG. 15 shows an illustration relating to a third variant according to the invention of the blocking device.
FIG. 16 shows an illustration relating to a third variant according to the invention of the blocking device.

FIG. 13 shows a second embodiment of the present invention. Two specific features can be seen therein. On the one hand, on the component 66B of the pivot arm 66 in the region of the polygonal opening 80 a hexagonal bracket 110 having a hexagonal opening 112 is provided. This hexagonal bracket 110 is adapted in terms of its position and the sizing of the hexagonal opening 112 to the hexagonal opening 102 in the connection member 54. By inserting a correspondingly sized hexagon key 104 (not shown in FIG. 13), for example, of the size HEX5, the base element 26 and the pivot mechanism 30 can be orientated even more precisely with respect to each other in the blocking position.

It is further possible to see another blocking device 118. This blocking device 118 is shown in section in FIG. 14. It comprises a displaceable resiliently pretensioned blocking pin 118 having a head 120 and a shaft 122. The shaft 122 is received in a guide hole 124 in the component 66*b* of the pivot arm 66. It is secured to prevent loss via the securing ring 126. A pretensioning spring 128 tensions the blocking pin 118 into a passive position. In the connection member 54, a receiving opening 130 which is adapted to the diameter of the blocking pin 118 is formed. When the blocking pin 118 and the receiving opening 130 are orientated in alignment, the pin can be pressed into the receiving opening 130 counter to the action of the spring 128. To this end, it is necessary for the pivot mechanism 30 to be orientated relative to the base element 26 by the movable element 28 being pivoted relative to the base element 26 counter to the action of the tensioning spring 90. If the aligned orientation with the receiving opening 130 is achieved, the blocking pin 118 can be pressed into the receiving opening 130. If the movable element 28 is released, the blocking pin 118 is clamped in the receiving opening 130 and consequently blocks the derailleur 20 in the associated assembly position.

With the embodiment according to FIGS. 13 and 14, the derailleur 20 can consequently be blocked in two different assembly positions, once with a hexagon key via the hexagonal bracket 112 and once via the blocking pin 118.

By pulling the blocking member or relieving the blocking pin 118 in order to cancel the tensioning, the securing in the blocking position can be released again.

The embodiment according to FIGS. 15 and 16 shows another variant of the invention. In this variant, an adjustable blocking apparatus 118 is formed in the component 66*b* of the pivot arm 66. This is shown in FIG. 16 as an individual component illustration. It is in the form of a so-called flip chip, that is to say, it has a non-circular or oval contour and can be moved by rotation through 180° into two different pivot positions. In these pivot positions, the blocking apparatus 118 can be locked in each case by means of a locking mechanism. To this end, a locking projection 134 is provided.

As a result of the non-circular profile of the blocking apparatus 130, depending on the rotation position thereof during a rotation about the eccentric longitudinal axis thereof through 180° in a clockwise direction or in a counter-clockwise direction, different assembly positions can be reached when it is inserted through the receiving opening 80 into a corresponding receiving opening 132 in the connection member 54. The effect is the same depending on the rotation position of the blocking apparatus 130, the derailleur 20 can be adjusted to the bicycle category present in each case. The blocking apparatus can be removed after the adjustment, for example, it may also be in the form of a disposable component.

Figure 17:
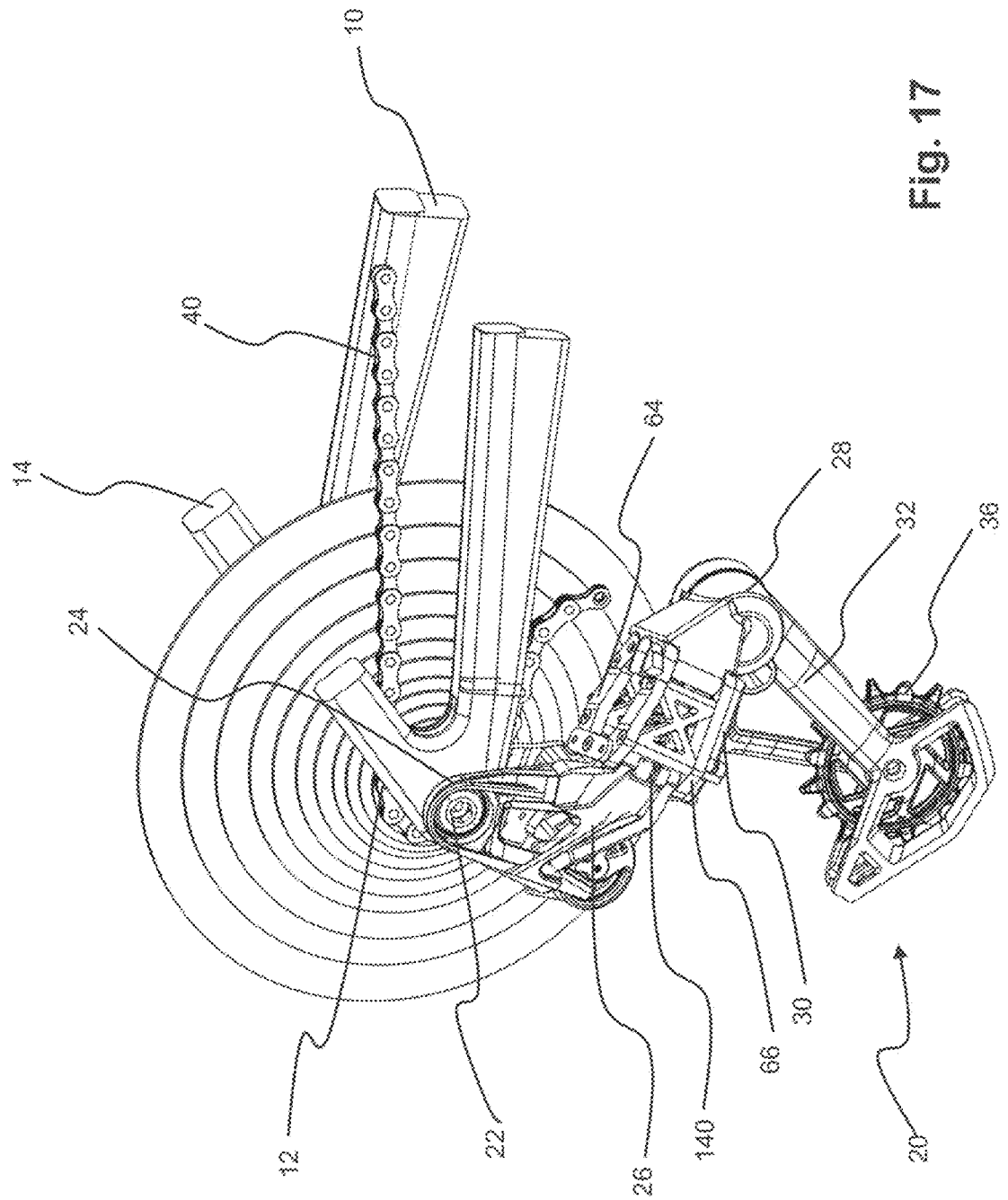
FIG. 17 shows another schematic partial illustration of a rear wheel arrangement having a schematically illustrated derailleur.

FIG. 17 shows another schematic view of a rear derailleur 20. This has a specific blocking apparatus 140 which is explained below with reference to FIGS. 18-21.

The base element 26 and the movable element 28 are known to be connected to each other by the pivot mechanism 30. The pivot arms 64, 66 of the pivot mechanism 30 are movably supported on the base element 26 or on the movable element 28 by pivot axles 82, 84, 86, 88. Reference may be made to the exploded illustration according to FIG. 8 whose description and labelling applies in the same manner. In the embodiment shown in FIGS. 18-21, on one of the pivot axles 84 a blocking member 142 is pivotably supported. This blocking member 142 has to this end a sleeve-like shaft 144 having a central opening. A blocking arm 146 is formed in a protruding manner on the sleeve-like shaft 144. Furthermore, the blocking member 142 is pretensioned in an upward direction by a helical spring 148.

The blocking member 142 can be pressed downwards counter to the action of the helical spring 148 and displaced between a passive position and an active position. In the passive position, the blocking arm 146 is pivoted into the pivot mechanism so that it neither stands in the way of a movement of the pivot mechanism 30 for switching, nor comes into contact with the movable element 28. Furthermore, the blocking member 142 can be displaced downwards counter to the action of the helical spring 148 along the pivot axis 84 and can consequently be rotated from the passive position into an active position in which it blocks a relative movement between the pivot mechanism 30 and the movable portion 28. The blocking arm 146 can be formed in such a manner that it even enables different blocking positions, in each case adapted to a bicycle category.

Of course, such a blocking apparatus 140 can be fitted with a pivotable blocking member 142 optionally on each of the pivot axles 82, 84, 86, 88. Other variants according to the invention can thereby be achieved.

Figures 22, 23:
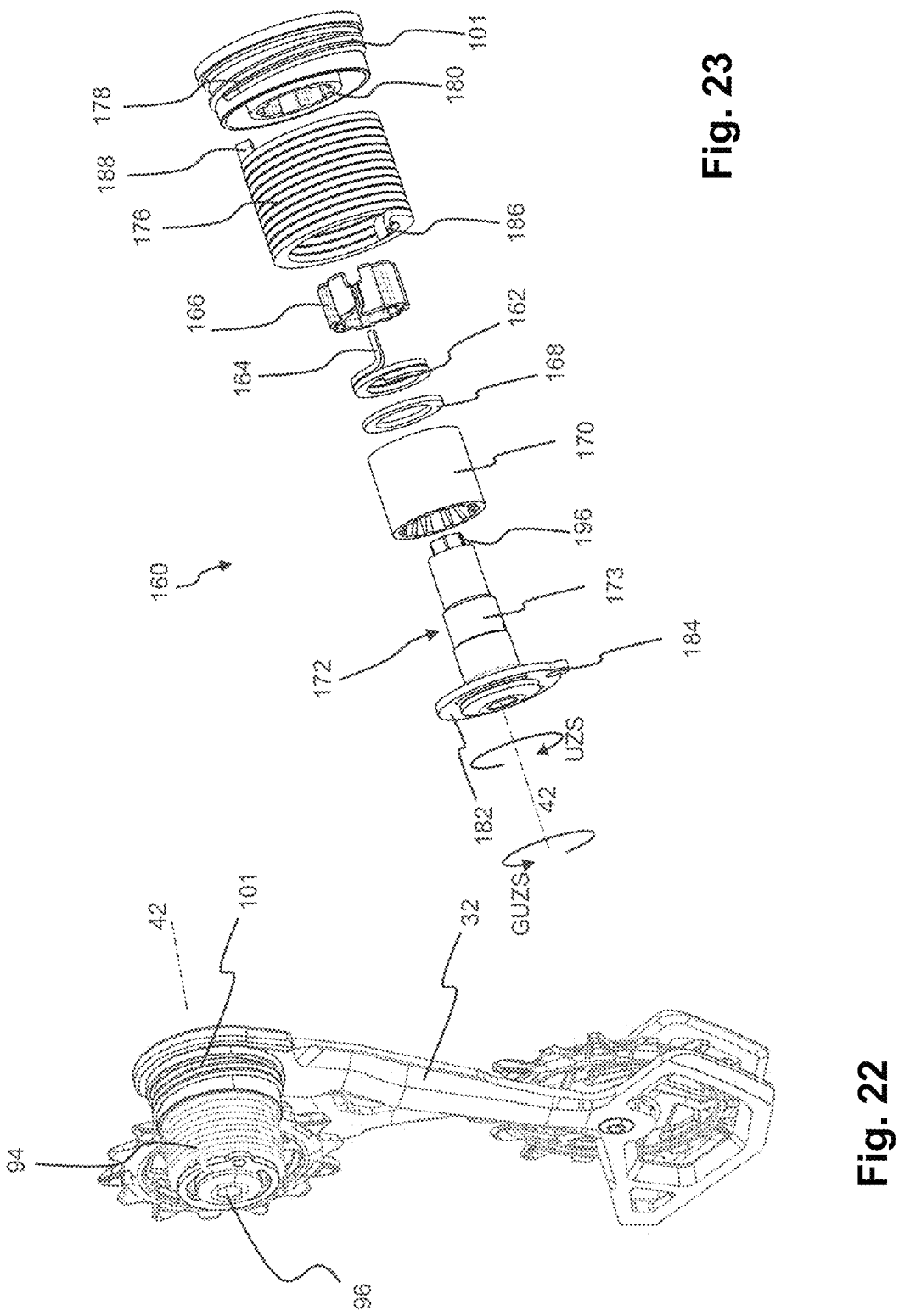
FIG. 22 shows an illustration of a sub-assembly comprising a pretensioning device, damping arrangement and chain guiding arrangement which can be mounted separately on the rear derailleur.
FIG. 23 shows a partial exploded view of components for explaining a damping device according to the invention.
Figure 24:
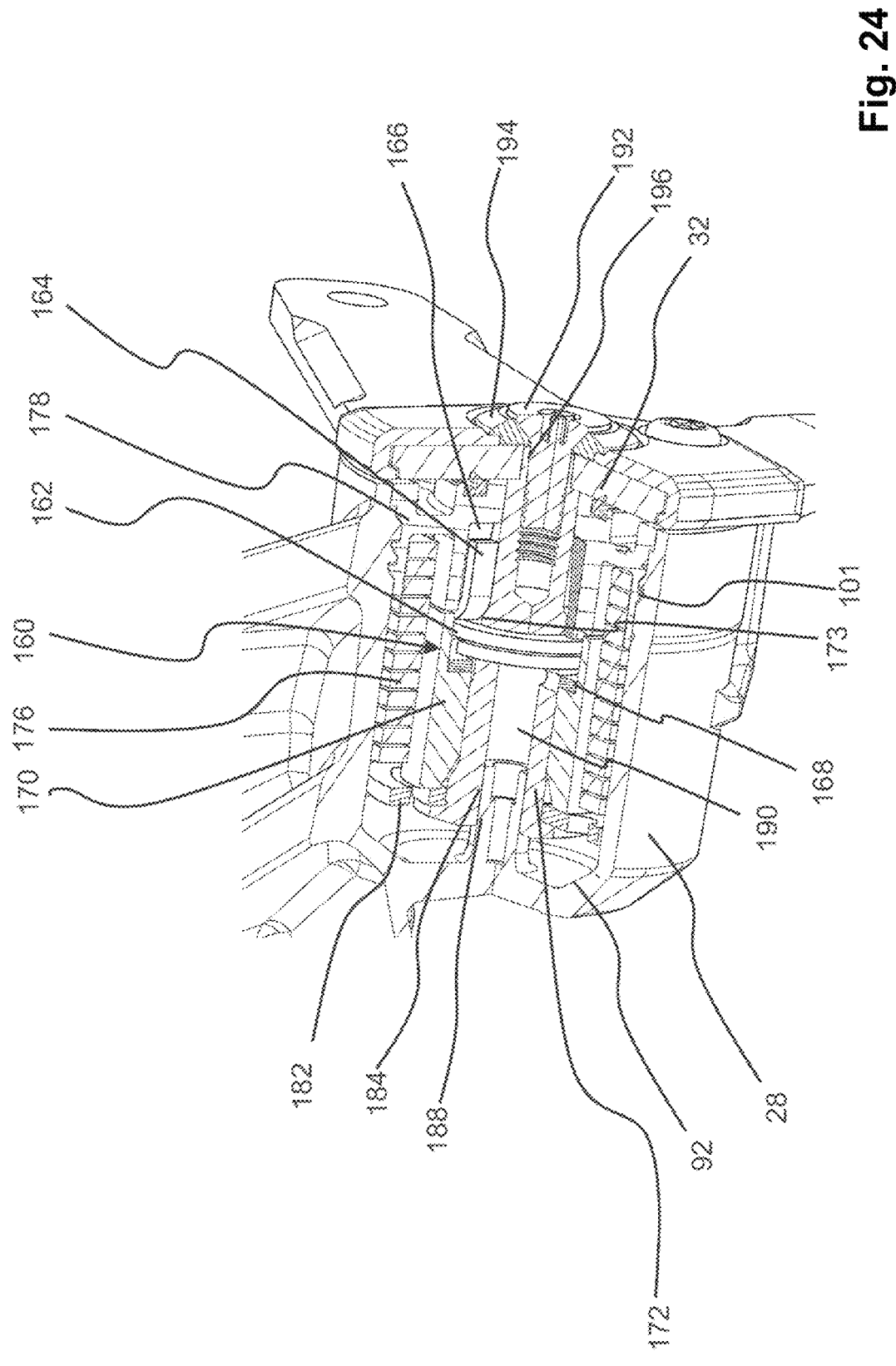
FIG. 24 shows a sectioned view through the damping device according to the invention.

FIGS. 22-24 relate to the pretensioning device 94 and damping arrangement 96, with which the chain guiding arrangement 32 is resiliently pretensioned and a movement of the chain guiding arrangement 32 relative to the movable element 28 is damped.

FIG. 22 shows the sub-assembly comprising the pretensioning device 94, damping arrangement 96 and chain guiding arrangement 32. Again, it should be noted that this sub-assembly can be screwed into the movable element 28 by the outer thread 101.

The damping arrangement 96 has a coupling device in the form of a disposable or freewheel clutch, in particular in the form of a spring clutch 160, having a damping spring 162 which in the exemplary embodiment is configured, for example, with only two spring windings. This damping spring 162 has a resilient flap 164. The resilient flap 164 is substantially in positive-locking engagement with a corresponding profiling in an insertion element 166, which is coupled to the housing of the movable element 28 by a circumferential profiling (see FIG. 23). The damping spring 162 is in abutment at the other end thereof with a spacer ring 168. The spacer ring 168 is in turn arranged on a plastics material bush 170 which in turn interacts with the pretensioning spring 176 which is in the form of a torsion spring on a rotary shaft 172.

The damping spring 162 acts in a radially damping direction. To this end, the damping spring 162 is expanded onto the shaft portion 173 of the rotary shaft 172, wherein the shaft portion 173 is configured to be slightly larger in terms of its diameter than the inner diameter of the damping spring 162 in the relaxed state thereof, that is to say, in the non-expanded state thereof. As a result of the expansion of the damping spring 162 on the shaft portion 173 of the rotary shaft 172, a damping friction force acts in a radial direction, on the circumferential face of the shaft portion 173. Therefore, the damping spring 162 cooperates radially with the shaft portion 173 of the rotary shaft 172, wherein, as a result of the orientation of the windings of the damping spring 162, the frictional engagement between these components is adjusted or changed depending on the rotation direction of the rotary shaft 172. The spacing ring 168 has at most little frictional action and acts substantially to separate and space apart the spring end of the damping spring 162 facing it and the plastics material bush 170.

The plastics material bush 170 acts again as a spacer and retains the damping spring 162 axially in position via the spacer ring 168. The pretensioning spring 176 is supported on the outer diameter of the plastics material bush 170, but is not notably radially in frictional engagement therewith.

The pretensioning spring 176 engages with one end on a receiving cap 178 on which the outer thread 101 is provided. The receiving cap 178 has a profiled inner opening 180 which cooperates with the profile of the insertion element 166.

The rotary shaft 172 is provided with a flange portion 182 in which an opening 184 is provided. This opening 184 correlates to a projection 186 of the pretensioning spring 176 and receives it in a torque-transmitting manner. Another projection 188 on the other end of the pretensioning spring 176 engages in turn in a torque-transmitting manner in the receiving cap 178.

The rotary shaft 172 is rotatably supported via the opening 184 on a protruding bearing continuation 188 of the receiving member 92, which continuation 188 engages in a hollow space 190 of the opening 184 in the rotary shaft 172. The rotatory shaft 172 extends through the receiving cap 178 which closes the hollow space within the receiving member 92 of the movable element 28.

Furthermore, the rotary shaft 172 is coupled via a hexagonal profile portion 196 in a positive-locking manner and consequently in a torque-transmitting manner to the chain guiding arrangement 32 and secured thereto by a counterscrew 192 and a spacer disc 194.

The pretensioning and consequently the damping is defined by the frictional engagement between the damping spring 162 and the shaft portion 173 of the rotary shaft 172, resulting from the fact that the damping spring 162 is expanded onto the shaft portion 173. As already explained, the inner diameter of the damping spring 162 in the relaxed, that is to say, non-expanded state, has smaller dimensions than the outer diameter of the shaft portion 173. The two windings of the damping spring 162 produce as a result of the expansion on the shaft portion 173 a frictional force between the damping spring 162 and the shaft portion 173 in a radial direction. The spring end 164 is rotationally secured at one end by the profiled insertion element 166 and via the accordingly profiled inner opening 180 of the receiving cap 178. If the rotary shaft 172 rotates with the shaft portion 173 thereof relative to the damping spring 162, this is "tightened" in one direction so that the frictional force increases. This direction corresponds in FIG. 23 to the rotation direction of the rotary shaft 172 in FIG. 23 in the counter-clockwise direction GUZS. If the rotary shaft 172 rotates with its shaft portion 173 relative to the damping spring 162 in the opposing rotation direction according to FIG. 23, in the clockwise direction UZS, the damping spring 162 is tendentially expanded so that the friction decreases.

The damping arrangement 96 shown with the spring 162 enables an instantaneous force transmission with good damping action with little structural spatial requirement.

Of course, the damping arrangement 96 described with reference to FIGS. 22-24 can also be used independently of the remaining structure, in particular of the blocking device. Accordingly, the damping arrangement 96, as described with reference to FIGS. 22-24, may also be considered to be a separate and independent aspect of the invention.

Text in FIG. 25: S1: Determining a bicycle category. S2: Selecting a blocking member which is adapted to the specific bicycle category. S3: Displacing the movable element relative to the base element counter to the action of the pretensioning spring. S4: Inserting the blocking member.

S5: Turning the derailleur backwards about the rear wheel axle in order to adjust the desired chain tension. S6: Fixing the derailleur to the frame after reaching the desired chain tension. S7: Removing the blocking member.

Various embodiments of the invention will be described herein with reference to the drawings. It will be understood that the drawings and the description set out herein are provided for illustration only and do not limit the invention as defined by the claims appended hereto and any and all their equivalents. For example, the terms "first" and "second", "front" and "rear", "left" and "right" are used for the sake of clarity and not as terms of limitation. Moreover, the terms referred to bicycle mechanisms conventionally mounted to a bicycle and with the bicycle orientated and used in a standard fashion unless otherwise indicated.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72 (b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A rear derailleur for a bicycle gearing system comprising:
   a base element which can be fitted to a bicycle frame; and
   a movable element which is coupled to the base element by a pivot mechanism and which can be displaced relative thereto in a pivotally movable manner, wherein the pivot mechanism is pivotably movable both relative to the movable element and relative to the base element,
   characterized by a blocking device which is configured to at least temporarily secure the movable element relative to the base element, wherein the blocking device is configured in such a manner that the pivot mechanism can be temporarily secured by a direct coupling relative to the base element or relative to the movable element in at least one predetermined blocking position.

2. The rear derailleur according to claim 1, wherein the base element or/and the movable element has a first receiving opening and in that the pivot mechanism has on a component a second receiving opening, wherein the first and second receiving openings in at least one predetermined relative position of the movable element are orientated with respect to each other relative to the base element in such a manner that, in the event of an at least partial alignment of the first and second receiving openings, a blocking member can be introduced therein in order to produce the direct coupling in order to block a pivot movement of the movable element relative to the base element via the pivot mechanism.

3. The rear derailleur according to claim 1, wherein the pivot mechanism comprises at least two pivot arms, wherein a first pivot arm is pivotably coupled to the base element with the first end portion thereof and pivotably coupled to the movable element with the second end portion thereof, wherein a second pivot arm is pivotably coupled to the base element with the first end portion thereof and pivotably coupled to the movable element with the second end portion thereof.

4. The rear derailleur according to claim 3, wherein the base element and/or the movable element has/have a first receiving opening and in that the first pivot arm and/or the second pivot arm has/have a second receiving opening, wherein the first and second receiving openings are orientated in at least one predetermined relative position of the movable element with respect to each other relative to the base element in such a manner that, in the event of an at least partial alignment of the first and second receiving openings, a blocking member can be introduced therein in order to produce the direct coupling in order to block a pivot movement of the movable element relative to the base element via the pivot mechanism.

5. The rear derailleur according to claim 4, wherein at least one of the first and second receiving openings is formed with a torsion-resistant receiving profile, in particular with a hexagonal profile.

6. The rear derailleur according to claim 5, wherein the derailleur is in the form of a cable-operated derailleur, wherein at least one of the pivot arms is in the form of an extension arm for fitting a cable pull, wherein the extension arm is configured with the second receiving opening.

7. The rear derailleur according to claim 5, wherein the derailleur is in the form of a motor-activated derailleur, wherein particularly the drive motor and a drive gear mechanism which is associated therewith is arranged at least partially on the base element.

8. The rear derailleur according to claim 5, wherein as a result of the provision of at least two differently sized blocking members, which, in order to produce the direct coupling, can be introduced into the at least partially aligned first and second receiving openings, the rear derailleur can be temporarily secured in at least two predetermined blocking positions.

9. The rear derailleur according to claim 8, wherein the blocking device has a blocking pin which is fitted to one of the components base element or first pivot arm or second pivot arm or movable element, and in that, in order to temporarily secure the derailleur in the at least one blocking position, the base element or the movable element is directly coupled to the first pivot arm or the second pivot arm in order to avoid a pivot movement.

10. The rear derailleur according to claim 9, wherein the blocking pin is resiliently pretensioned into a blocking-free passive position and/or can be locked therein.

11. The rear derailleur according to claim 10, wherein the blocking pin has a cross sectional profile which differs from a circle and/or is supported in an eccentric manner so that it can be fitted in at least two different relative positions relative to one of the components base element or first pivot arm or second pivot arm or movable element in order to achieve at least two different blocking positions.

12. The rear derailleur according to claim 11, wherein in order to produce the direct coupling, a pivotable, preferably resiliently pretensioned blocking member is arranged about one of the pivot axles of the pivot mechanism, wherein so as to overcome the resilient pretensioning, it can be pivoted between a passive position and at least one blocking position about the associated pivot axis, wherein the blocking member in the passive position permits the relative movement between the base element and the movable element via the pivot mechanism and wherein the blocking member in the at least one blocking position provides a direct coupling between the base element or the movable element and the pivot mechanism so that a relative movement between the base element and the movable element is blocked in a predetermined position.

13. The rear derailleur according to claim 1, wherein a chain guiding arrangement which is coupled to the movable element and which can be pivoted relative thereto about a pivot axis and a pretensioning device, by which the chain guiding arrangement is pretensioned relative to the movable element about the pivot axis into a starting position, wherein the chain guiding arrangement can be pivoted counter to a tensioning force of the pretensioning device from the starting position about the pivot axis into different operating positions.

14. The rear derailleur according to claim 13, wherein the chain guiding arrangement together with the pretensioning device is combined to form a sub-assembly which can be fitted by a releasable connection to the movable element.

15. The rear derailleur according to claim 14, wherein the pivot mechanism has pivot axles which are orientated substantially orthogonally with respect to the rear wheel axle.

16. The rear derailleur according to claim 15, wherein the pretensioning device has a damping arrangement which is configured to counteract a damping effect of a relative movement between the movable element and the chain guiding arrangement, wherein the damping arrangement comprises a coupling device via which the damping arrangement is coupled to a rotary shaft and a support, wherein the coupling device has a damping spring which is supported, on the one hand, on the rotary shaft and, on the other hand, on an insertion portion which is or can be coupled to the movable element and which between them via frictional engagement develops its damping action, preferably in a radial direction.

17. The rear derailleur according to claim 16, wherein the damping spring is fitted in a rotationally secure manner with one end to one of the components rotary shaft and movable element and is directly or indirectly in frictional engagement with the other component rotary shaft and movable element, preferably in radial frictional engagement, wherein the damping effect increases or decreases depending on the direction of the relative rotation.

18. The rear derailleur according to claim 17, wherein the damping spring has a maximum number of four windings, preferably a maximum number of three windings, more preferably a maximum number of two windings.

19. The rear derailleur according to claim 18, wherein that the insertion portion is made from metal.

20. The rear derailleur according to claim 19, wherein a resilient force storage device is coupled via the rotary shaft to the chain guiding sub-assembly in order to apply the pretensioning force via the rotary shaft to the chain guiding sub-assembly.

* * * * *